(12) United States Patent
Adams, III et al.

(10) Patent No.: US 12,418,419 B2
(45) Date of Patent: Sep. 16, 2025

(54) TECHNOLOGIES FOR TRUST PROTOCOL WITH IMMUTABLE CHAIN STORAGE AND INVOCATION TRACKING

(71) Applicant: ONTOLOGIX, LLC, Memphis, TN (US)

(72) Inventors: Marvin Eugene Adams, III, Memphis, TN (US); Samuel Rodriguez, III, Memphis, TN (US)

(73) Assignee: ONTOLOGIX, LLC, Memphis, TN (US)

( * ) Notice: Subject to any disclaimer, the term of this patent is extended or adjusted under 35 U.S.C. 154(b) by 422 days.

(21) Appl. No.: 17/550,290

(22) Filed: Dec. 14, 2021

(65) Prior Publication Data

US 2022/0191034 A1    Jun. 16, 2022

Related U.S. Application Data

(60) Provisional application No. 63/262,198, filed on Oct. 7, 2021, provisional application No. 63/146,121, filed on Feb. 5, 2021, provisional application No. 63/125,055, filed on Dec. 14, 2020.

(51) Int. Cl.
*H04L 9/32* (2006.01)
*H04L 9/08* (2006.01)

(52) U.S. Cl.
CPC ............ *H04L 9/3236* (2013.01); *H04L 9/088* (2013.01)

(58) Field of Classification Search
CPC .............................. H04L 9/3236; H04L 9/088
See application file for complete search history.

(56) References Cited

U.S. PATENT DOCUMENTS

| | | | |
|---|---|---|---|
| 10,735,193 B1* | 8/2020 | Knas | H04L 9/3239 |
| 2014/0019771 A1* | 1/2014 | Emmett | H04L 9/0643 713/189 |
| 2019/0074962 A1* | 3/2019 | Ateniese | H04L 9/0643 |
| 2019/0258697 A1* | 8/2019 | Wu | G06F 17/18 |
| 2020/0382309 A1* | 12/2020 | Jayachandran | H04L 9/3297 |
| 2021/0216449 A1* | 7/2021 | Eisenhuth | G06F 12/04 |

* cited by examiner

*Primary Examiner* — Nelson S. Giddins
(74) *Attorney, Agent, or Firm* — Finch & Maloney PLLC

(57) ABSTRACT

Technologies for trust protocol execution include a network of servers in communication with client devices. A client device splits a request into input data blocks, connects to a server, and sends an input data block to the server. The server encodes the input data block with an encoding pad to generate an encoded data block, generates a hash value as a function of the encoded data block, and modifies the encoding pad as a function of the hash value to generate a modified encoding pad. The server adds the encoded data block to a blockchain and returns an indication of the input data block stored on the blockchain. The server may add a verification puzzle based on a timestamp to the encoded data block. The server may request a security certificate from a certificate authority for a web address based on the hash value. Other embodiments are described and claimed.

12 Claims, 9 Drawing Sheets

TECHNOLOGIES FOR TRUST PROTOCOL WITH IMMUTABLE CHAIN STORAGE AND INVOCATION TRACKING

CROSS-REFERENCE TO RELATED APPLICATIONS

The present application claims priority under 35 U.S.C. § 119(e) to U.S. Provisional Application Ser. No. 63/125,055, filed Dec. 14, 2020, to U.S. Provisional Application Ser. No. 63/146,121, filed Feb. 5, 2021, and to U.S. Provisional Application Ser. No. 63/262,198, filed Oct. 7, 2021, the entire disclosure of each of which is hereby incorporated by reference.

BACKGROUND

Blockchain is typically referred to as a shared ledger or database that facilitates the process of recording transactions and tracking various items such as assets in a business network. Various assets can be tracked and traded on a blockchain network, which may reduce risk and cut costs for users. Typical blockchain technologies may facilitate transactions by untrusted parties using a decentralized consensus mechanism such as a proof of work algorithm. Such systems may have high energy consumption and relatively low throughput.

SUMMARY

According to one aspect of the disclosure, a computing device for trust protocol execution includes a client interface, a block encoder, and a chain manager. The client interface is to receive an input data block from a client computing device. The block encoder is to encode the input data block with an encoding pad to generate an encoded data block, generate a hash value as a function of the encoded data block with a cryptographic hash function, and modify the encoding pad as a function of the hash value to generate a modified encoding pad. The chain manager is to add the encoded data block to a blockchain.

In an embodiment, the client interface is further to receive a second input data block from the client computing device. The block encoder is further to encode the second input data block with the modified encoding pad to generate a second encoded data block, generate a second hash value as a function of the second encoded data block with the cryptographic hash function, and modify the modified encoding pad as a function of the second hash value to generate a second modified encoding pad.

In an embodiment, the encoding pad comprises an array of byte values having a length equal to a maximum byte value. In an embodiment, to encode the input data block with the encoding pad comprises, for each input byte of the input data block to index the encoding pad with the input byte to retrieve an output byte. In an embodiment, to modify the encoding pad as a function of the hash value comprises to convert the hash value to a sequence of pairs of bytes; and for each pair of bytes, (i) index the encoding pad at a first byte index of the pair of bytes and at a second index of the pair of bytes and (ii) swap encoding pad values at the first byte index and at the second byte index.

In an embodiment, the block encoder is further to initialize the encoding pad with a predetermined pad value. To encode the input data block with the encoding pad comprises to encode the input data block after initialization of the encoding pad. In an embodiment, the predetermined pad value comprises an identity mapping.

In an embodiment, to add the encoded data block to the blockchain comprises to determine a timestamp, wherein the timestamp comprises a current time at microsecond resolution; add the timestamp as a header to the encoded data block; generate a verification puzzle based on the timestamp and the encoding pad; and add the verification puzzle to the encoded data block. In an embodiment, to generate the verification puzzle comprises to select a predetermined number of bytes from the timestamp; and record the predetermined number of bytes and, for each predetermined byte, a corresponding position in the encoding pad.

In an embodiment, to add the encoded data block to the blockchain comprises to generate a web page based on the encoded data block; generate a web address for the web page as a function of the hash value; and request a security certificate for the web address from a third-party certificate authority. In an embodiment, to generate the web address comprises to select a predetermined number of characters from the hash value. In an embodiment, to add the encoded data block to the blockchain comprises to determine whether a predetermined number of encoded data blocks have been added to the blockchain. To request the security certificate for the web address comprises to request the security certificate in response to a determination that the predetermined number of encoded data blocks have been added to the blockchain.

In an embodiment, the client interface is further to verify a permissions key in response to receipt of the input data block, wherein the input data block comprises the permissions key; and to add the encoded data block comprises to add the encoded data block in response to verification of the permission key. In an embodiment, to verify the permissions key comprises to verify a signature of the permissions key with a user certificate, wherein the user certificate is associated with a permission.

In an embodiment, the chain manager is further to execute a command in response to receipt of the input data block, wherein the input data block comprises the command; and to add the encoded data block comprises to add the encoded data block in response to execution of the command. In an embodiment, to execute the command comprises to execute a protocol stored on the blockchain.

According to another aspect, a method for trust protocol execution includes receiving, by the computing device, an input data block from a client computing device; encoding, by the computing device, the input data block with an encoding pad to generate an encoded data block; generating, by the computing device, a hash value as a function of the encoded data block using a cryptographic hash function; modifying, by the computing device, the encoding pad as a function of the hash value to generate a modified encoding pad; and adding, by the computing device, the encoded data block to a blockchain.

In an embodiment, the method further comprises receiving, by the computing device, a second input data block from the client computing device; encoding, by the computing device, the second input data block with the modified encoding pad to generate a second encoded data block; generating, by the computing device, a second hash value as a function of the second encoded data block using the cryptographic hash function; and modifying, by the computing device, the modified encoding pad as a function of the second hash value to generate a second modified encoding pad.

In an embodiment, the encoding pad comprises an array of byte values having a length equal to a maximum byte value. In an embodiment, encoding the input data block with the encoding pad comprises, for each input byte of the input data block indexing the encoding pad with the input byte to retrieve an output byte. In an embodiment, modifying the encoding pad as a function of the hash value comprises converting the hash value to a sequence of pairs of bytes; and for each pair of bytes, (i) indexing the encoding pad at a first byte index of the pair of bytes and at a second index of the pair of bytes and (ii) swapping encoding pad values at the first byte index and at the second byte index.

In an embodiment, the method further includes initializing, by a computing device, the encoding pad with a predetermined pad value; wherein encoding the input data block with the encoding pad comprises encoding the input data block after initializing the encoding pad. In an embodiment, the predetermined pad value comprises an identity mapping.

In an embodiment, adding the encoded data block to the blockchain comprises determining a timestamp, wherein the timestamp comprises a current time at microsecond resolution; adding the timestamp as a header to the encoded data block; generating a verification puzzle based on the timestamp and the encoding pad; and adding the verification puzzle to the encoded data block. In an embodiment, generating the verification puzzle comprises selecting a predetermined number of bytes from the timestamp; and recording the predetermined number of bytes and, for each predetermined byte, a corresponding position in the encoding pad.

In an embodiment, adding the encoded data block to the blockchain comprises generating a web page based on the encoded data block; generating a web address for the web page as a function of the hash value; and requesting a security certificate for the web address from a third-party certificate authority. In an embodiment, generating the web address comprises selecting a predetermined number of characters from the hash value. In an embodiment, adding the encoded data block to the blockchain comprises determining whether a predetermined number of encoded data blocks have been added to the blockchain; wherein requesting the security certificate for the web address comprises requesting the security certificate in response to determining that the predetermined number of encoded data blocks have been added to the blockchain.

In an embodiment, the method further includes verifying, by the computing device, a permissions key in response to receiving the input data block, wherein the input data block comprises the permissions key; wherein adding the encoded data block comprises adding the encoded data block in response to verifying the permission key. In an embodiment, verifying the permissions key comprises verifying a signature of the permissions key with a user certificate, wherein the user certificate is associated with a permission.

In an embodiment, the method further includes executing, by the computing device, a command in response to receiving the input data block, wherein the input data block comprises the command; wherein adding the encoded data block comprises adding the encoded data block in response to executing the command. In an embodiment, executing the command comprises executing a protocol stored on the blockchain.

According to another aspect, a computing device for trust protocol execution includes a block generator and a server interface. The block generator is to split a request message into a plurality of input data blocks, wherein each input data block has a predetermined size. The server interface is to, for each input data block of the plurality of input data blocks, connect to a server of a plurality of servers; send the input data block to the server in response to connection to the server; receive an indication of the input data block stored on a blockchain from the server in response to sending of the input data block; and record the indication of the input data block and an identification of the server. In an embodiment, to connect to the server comprises to secure a virtual private network connection with a user certificate.

In an embodiment, the computing device further includes an application manager to configure the request message as a request to write a data file to the blockchain. In an embodiment, the computing device further includes an application manager to configure the request message as a request to write program code to the blockchain. In an embodiment, the computing device of claim 401, further includes an application manager to configure the request message as a request to execute a protocol stored on the blockchain.

In an embodiment, the computing device further includes an application manager to configure a permissions key associated with an operation of the request message, wherein the request message comprises the permissions key. In an embodiment, to configure the permissions key comprises to sign a message with a user certificate to generate the permissions key, wherein the user certificate is associated with a permission. In an embodiment, to configure the permissions key further comprises to submit the message signed with the user certificate for approval by a second user; and receive the permissions key in response to submission of the message signed with the user certificate, wherein the permissions key comprises the message signed with the user certificate signed with a second user certificate, wherein the second user certificate is associated with the permission.

In an embodiment, the computing device further includes an application manager 212 to encrypt message data of the request message with a client key, wherein to send the input data comprises to send the input data after encryption of the message data.

In an embodiment, the computing device further includes an application manager to encode an indicator of an input data block with a private key to generate an encrypted block identifier; and generate a graphical indicator of the encrypted block identifier, wherein the graphical indicator is attached to a physical object.

According to another aspect, a method for trust protocol execution includes splitting, by a computing device, a request message into a plurality of input data blocks, wherein each input data block has a predetermined size; for each input data block of the plurality of input data blocks: connecting, by the computing device, to a server of a plurality of servers; sending, by the computing device, the input data block to the server in response to connecting to the server; receiving, by the computing device, an indication of the input data block stored on a blockchain from the server in response to sending the input data block; and recording, by the computing device, the indication of the input data block and an identification of the server. In an embodiment, connecting to the server comprises securing a virtual private network connection with a user certificate.

In an embodiment, the method further includes configuring, by the computing device, the request message as a request to write a data file to the blockchain. In an embodiment, the method further includes configuring, by the computing device, the request message as a request to write program code to the blockchain. In an embodiment, the method further includes configuring, by the computing device, the request message as a request to execute a protocol stored on the blockchain.

In an embodiment, the method further includes configuring, by the computing device, a permissions key associated with an operation of the request message, wherein the request message comprises the permissions key. In an embodiment, configuring the permissions key comprises signing a message with a user certificate to generate the permissions key, wherein the user certificate is associated with a permission. In an embodiment, configuring the permissions key further comprises submitting the message signed with the user certificate for approval by a second user; and receiving the permissions key in response to submitting the message signed with the user certificate, wherein the permissions key comprises the message signed with the user certificate signed with a second user certificate, wherein the second user certificate is associated with the permission.

In an embodiment, the method further includes encrypting, by the computing device, message data of the request message with a client key, wherein sending the input data comprises sending the input data after encrypting the message data.

In an embodiment, the method further includes encoding, by the computing device, an indicator of an input data block with a private key to generate an encrypted block identifier; generating, by the computing device, a graphical indicator of the encrypted block identifier; and attaching the graphical indicator to a physical object.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
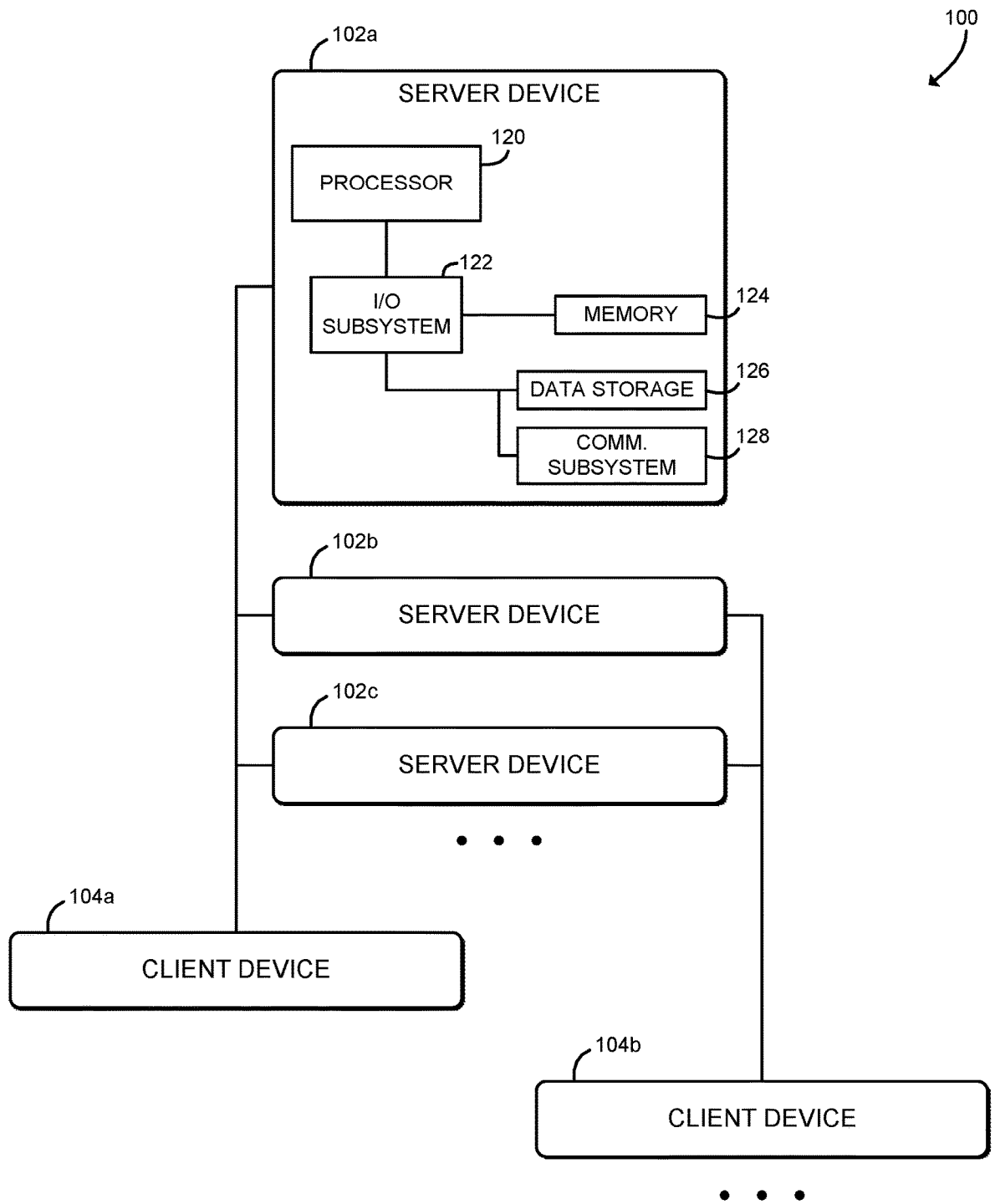
FIG. 1 is a simplified block diagram of at least one embodiment of a trust protocol system.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative trust protocol system 100 includes multiple server devices 102 in communication with multiple client devices 104. Illustratively, the system 100 includes three servers 102a, 102b, 102c and two client devices 104a, 104b; however, in some embodiments the system 100 may include from five servers 102 to ten servers 102, from six servers 102 to nine servers 102, seven servers 102, or another number of servers 102 and/or client devices 104. In use, as described further below, a client 104 may send a request message such as file data to a server 104 to be encoded on a blockchain. The server 102 encodes each block using an encoding pad or other encoding function that is not known to the client device 104 and then generates a cryptographic hash of the encoded block. The encoded block is added to the blockchain, and the hash is used to modify the encoding function for the next block. Because the encoding function is based on a cryptographic hash of a previous block, the contents of the encoded block depend on the previous blocks in the chain, and an attacker is not able to control the encoding function by controlling the input data. Accordingly, the system 100 provides a system for immutable data storage on a blockchain. Thus, the system 100 may provide a means for bypassing the need for a trusted third party. Similarly, the system 100 may provide an alternative embodiment for double entry accounting thereby allowing entries to be put on a single ledger. As described further below, the hash value and encoding function are tied together, and thus any mutations may be detected automatically. Accordingly, the system 100 described herein may streamline the verification process and secure blockchain data in a way that is faster and more scalable than typical enterprise blockchain technology.

For example, in an illustrative test environment, a system 100 according to the present disclosure included seven computers arranged in a cluster with standard networking equipment. All seven computers were arranged to accept input and transform their encoding pads independently, with the ability to playback or trace those changes, as described further herein. That test system was able to achieve throughput of 13 Mb/s with the full stack of text encode/byte switch/write data implemented. Additionally, by including many different points of failure (e.g., seven servers or more servers in a cloud environment), one client device 104 was unable to interfere with the data of another. Such a system design created another layer of complexity that further secured the chain from an attacker. With a relatively small number of servers 102 (e.g., about 50 servers 102), an attacker is unable to determine which servers 102 are involved in securing a particular chain or client session. Thus, this exemplified system 100 may also improve transaction security.

Each server 102 may be embodied as any type of device capable of performing the functions described herein. For example, a server 102 may be embodied as, without limitation, a server, a rack-mounted server, a blade server, a workstation, a network appliance, a web appliance, a desktop computer, a laptop computer, a tablet computer, a smartphone, a consumer electronic device, a distributed computing system, a multiprocessor system, and/or any other computing device capable of performing the functions described herein. Additionally, in some embodiments, the server 102 may be embodied as a "virtual server" formed from multiple computing devices distributed across the network 108 and operating in a public or private cloud. Accordingly, although each server 102 is illustrated in FIG. 1 as embodied as a single computing device, it should be appreciated that each server 102 may be embodied as multiple devices cooperating together to facilitate the functionality described below. As shown in FIG. 1, the illustrative server 102 includes a processor 120, an I/O subsystem 122, memory 124, a data storage device 126, and a communication subsystem 128. Of course, the server 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor or compute engine capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the server 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the server 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the server 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the server 102 may be embodied as any communication circuit, device, or collection thereof, capable of enabling communications between the server 102, the client device 104, the client device 104, and/or other remote devices. The communication subsystem 128 may be configured to use any one or more communication technology (e.g., wireless or wired communications) and associated protocols (e.g., Ethernet, InfiniBand®, Bluetooth®, WiMAX, 3G LTE, 5G, etc.) to effect such communication.

Each client device 104 is configured to submit data to the servers 102 and otherwise perform the functions described herein. Thus, each client device 104 may be embodied as any type of computation or computer device capable of performing the functions described herein, including, without limitation, a computer, a workstation, a server, a rack-mounted server, a blade server, a laptop computer, a notebook computer, a tablet computer, a mobile computing device, a wearable computing device, a multiprocessor system, a network appliance, a web appliance, a distributed computing system, a processor-based system, and/or a consumer electronic device. Thus, each of the client devices 104 includes components and devices commonly found in a computer or similar computing device, such as a processor, an I/O subsystem, a memory, a data storage device, and/or communication circuitry. Those individual components of the client device 104 may be similar to the corresponding components of the server 102, the description of which is applicable to the corresponding components of the client device 104 and is not repeated herein so as not to obscure the present disclosure. Additionally or alternatively, in some embodiments one or more of the client devices 104 may be embodied as virtual machines, cloud instances, or other components executed by one or more of the servers 102.

As discussed in more detail below, the servers 102 and the client devices 104 may be configured to transmit and receive data with each other and/or other devices of the system 100 over a network. The network may be embodied as any number of various wired and/or wireless networks. For example, the network may be embodied as, or otherwise include, a wired or wireless local area network (LAN), a wired or wireless wide area network (WAN), a cellular network, and/or a publicly-accessible, global network such as the Internet. As such, the network may include any number of additional devices, such as additional computers, routers, stations, and switches, to facilitate communications among the devices of the system 100.

Figure 2:
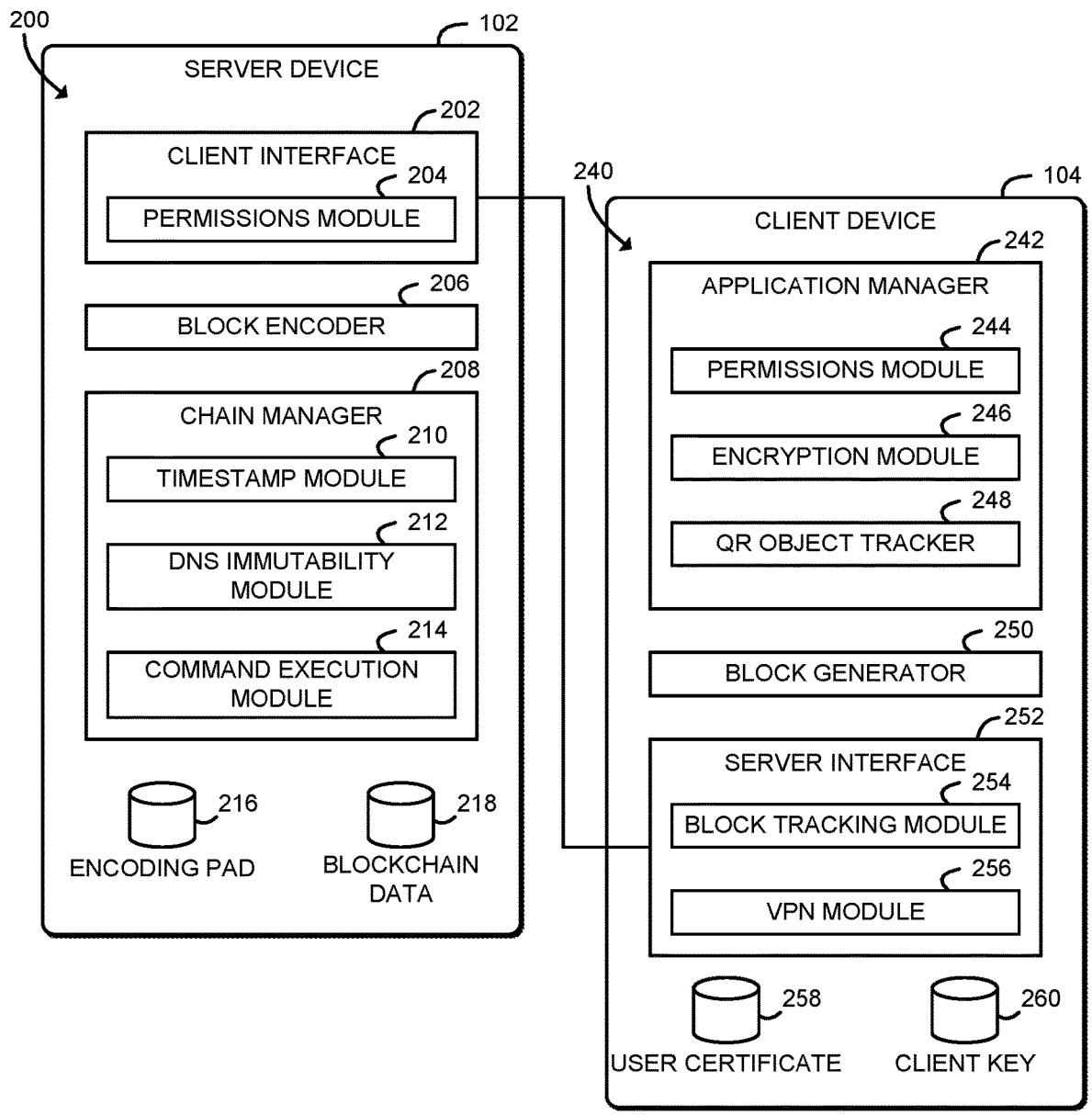
FIG. 2 is a simplified block diagram of various environments that may be established by the system of FIG. 1.

Referring now to FIG. 2, in the illustrative embodiment, the server 102 establishes an environment 200 during operation. The illustrative environment 200 includes a client interface 202, a block encoder 206, and a chain manager 208. The various components of the environment 200 may be embodied as hardware, firmware, software, or a combination thereof. As such, in some embodiments, one or more of the components of the environment 200 may be embodied as circuitry or a collection of electrical devices (e.g., client interface circuitry 202, block encoder circuitry 206, and/or chain manager circuitry 208). It should be appreciated that, in such embodiments, one or more of those components may form a portion of the processor 120, the I/O subsystem 122, and/or other components of the server 102.

The client interface 202 is configured to receive an input data block from a client device 104. The client interface 202 may be further configured to verify a permissions key in response to receiving the input data block. The input data block may include the permissions key. Verifying the permissions key may include verify a signature of the permissions key with a user certificate that is associated with a permission. In some embodiments, those functions may be performed by one or more sub-components, such as a permissions module 204.

The block encoder 206 is configured to encode the input data block with an encoding pad 216 to generate an encoded data block. The encoding pad 216 may comprise an array of byte values having a length equal to a maximum byte value (e.g., 256). The encoding pad 216 may be initialized with a predetermined pad value, such as an identity mapping. Encoding the input data block with the encoding pad 216 may include, for each input byte of the input data block to index the encoding pad 216 with the input byte to retrieve an output byte. The block encoder 206 is further configured to generate a hash value as a function of the encoded data block with a cryptographic hash function, and to modify the encoding pad 216 as a function of the hash value to generate a modified encoding pad 216. Modifying the encoding pad as a function of the hash value may include converting the hash value to a sequence of pairs of bytes, and for each pair of bytes, indexing the encoding pad 216 at a first byte index of the pair of bytes and at a second index of the pair of bytes, and swapping encoding pad 216 values at the first byte index and at the second byte index.

The chain manager 208 is configured to add the encoded data block to a blockchain. The encoded data block may be stored in blockchain data 218, which may be localized at the server device 102 or distributed among multiple locations. In some embodiments, adding the encoded data block to the blockchain may include determining a timestamp at microsecond resolution, adding the timestamp as a header to the encoded data block, generating a verification puzzle based on the timestamp and the encoding pad 216, and adding the verification puzzle to the encoded data block. Generating the verification puzzle may include selecting a predetermined number of bytes from the timestamp and recording the predetermined number of bytes and a corresponding position in the encoding pad for each predetermined byte. In some embodiments, adding the encoded data block to the blockchain may include generating a web page based on the encoded data block, generating a web address for the web page as a function of the hash value, and requesting a security certificate for the web address from a third-party certificate authority. Generating the web address may include selecting a predetermined number of characters from the hash value. The security certificate may be requested in response to a determination that a predetermined number of encoded data blocks have been added to the blockchain. In some embodiments, the chain manager 208 is further configured to execute a command in response to receiving an input data block that includes the command. The encoded data block is added in response to execution of the command. Executing the command may include to executing a protocol stored on the blockchain. In some embodiments, those functions may be performed by one or more subcomponents, such as a timestamp module 210, a DNS immutability module 212, and/or a command execution module 214.

Still referring to FIG. 2, in the illustrative embodiment, the client device 104 establishes an environment 240 during operation. The illustrative environment 240 includes an application manager 242, a block generator 250, and a server interface 252. The various components of the environment 240 may be embodied as hardware, firmware, software, or a combination thereof. As such, in some embodiments, one or more of the components of the environment 240 may be embodied as circuitry or a collection of electrical devices (e.g., application manager circuitry 242, block generator circuitry 250, and/or server interface circuitry 252). It should be appreciated that, in such embodiments, one or more of those components may form a portion of the processor, the I/O subsystem, and/or other components of the client device 104.

The application manager 242 is configured to configure a request message for the server 101. The request may be configured as a request to write a data file to the blockchain, to write program code to the blockchain, or to execute a protocol stored on the blockchain. The application manager 242 may be further configured to configure a permissions key associated with an operation of the request message. The request message may include the permissions key. Configuring the permissions key may include signing a message with a user certificate 258 associated with a permission to generate the permissions key. Configuring the permissions key may further comprise submitting the message signed with the user certificate for approval by a second user and receive the permissions key in response to submission of the message signed with the user certificate, wherein the permissions key comprises the message signed with the user certificate signed with a second user certificate, wherein the second user certificate is associated with the permission. In some embodiments, the application manager 242 may be configured to encrypt message data of the request message with a client key 260. In some embodiments, the application manager 242 may be further configured to encode an indicator of an input data block with a private key to generate an encrypted block identifier, and to generate a graphical indicator of the encrypted block identifier that is attached to a physical object. In some embodiments, those functions may be performed by one or more sub-components, such as a permission modules 244, an encryption module 246, and/or a QR object tracker 248.

The block generator 250 is configured to split a request message into a plurality of input data blocks, wherein each input data block has a predetermined size. The request message may include a request type, message data, encrypted data, a permission key, or other data.

The server interface 252 is configured to, for each input data block of the plurality of input data blocks, connect to a server 102 from multiple servers 102, send the input data block to the server 102 in response to connecting the server, receive an indication of the input data block stored on a blockchain from the server 102; and record the indication of the input data block and an identification of the server 102. Connecting to the server 102 may include securing a virtual private network (VPN) connection with a user certificate 258. In some embodiments, those functions may be performed by one or more sub-components, such as a block tracking module 254 and/or a VPN module 256.

Figure 3:
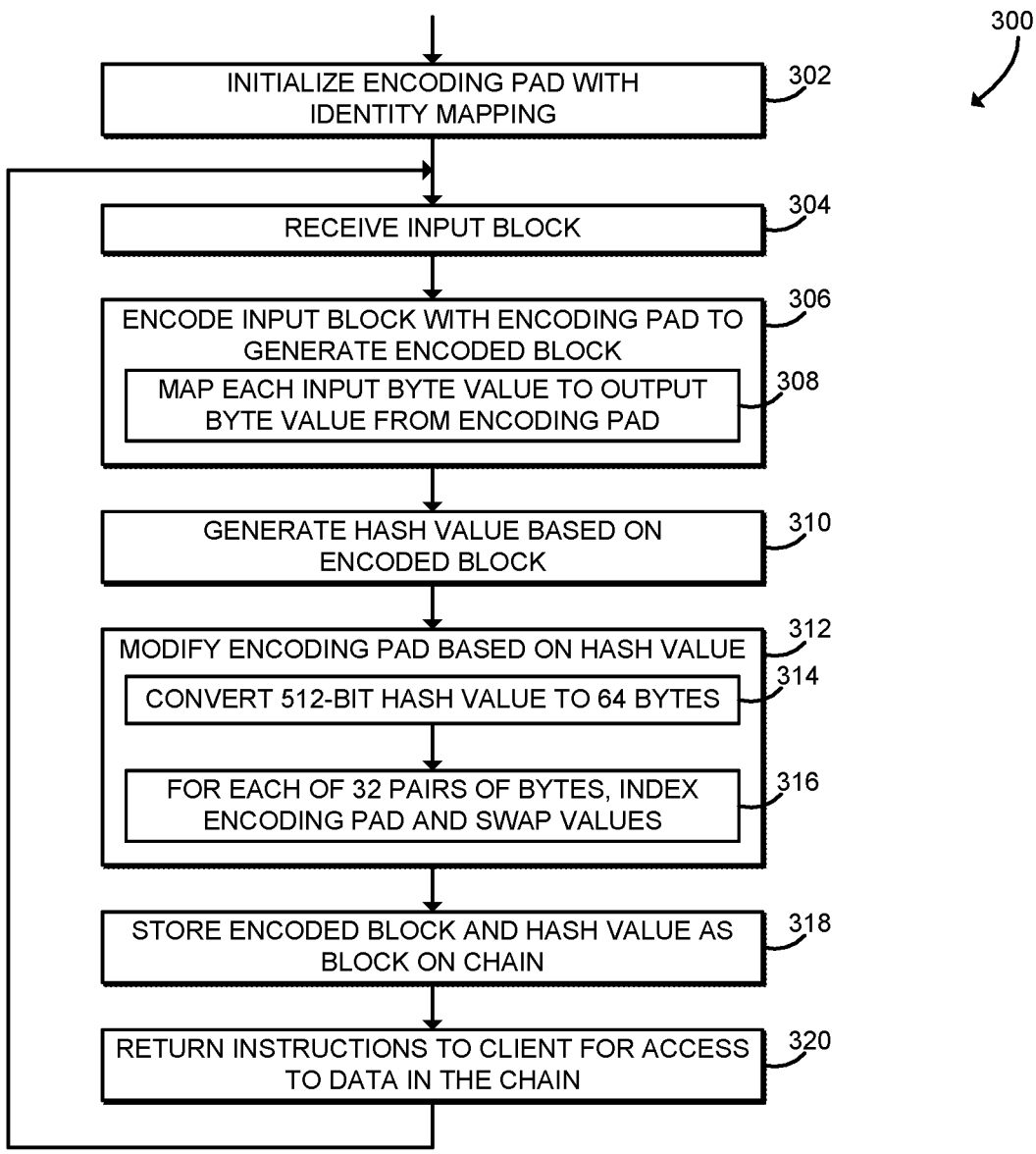
FIG. 3 is a simplified flow diagram of at least one embodiment of a method for adding an input block to a blockchain that may be executed by a server of FIGS. 1 and 2.

Referring now to FIG. 3, in use, a server 102 may execute a method 300 for adding an input block to a blockchain. It should be appreciated that, in some embodiments, the operations of the method 300 may be performed by one or more components of the environment 200 of the server 102 as shown in FIG. 2. The method 300 begins with block 302, in which the server 102 initializes its encoding pad 216 with an identity mapping. As described further below, when used to encode an input block, the identity mapping outputs an encoded block that is the same as the input block. In the illustrative embodiment, the encoding pad 216 is an array of 256 bytes, and the identity mapping is a sequence of byte values from zero to 255. Although in the illustrative embodiment, the encoding pad 216 is initialized with an identity mapping, it should be understood that in other embodiments the encoding pad 216 may be initialized with any well-known initial value.

In block 304, the server 102 receives an input data block from a client device 104. The input block may be embodied as any block of data having a predetermined size, such as from about 0.1 kB to about 10 kB, from about 0.5 kB to about 5 kB, or from about 1 kB to about 2.5 kB. In the illustrative embodiment, the input data block has a size of 1.5 kB (i.e., about 1500 bytes). The input data block may include plaintext data, encrypted data, or any other data provided by the client device 104 to be added to the blockchain.

In block 306, the server 102 encodes the input block with the encoding pad 216 to generate an encoded data block. The input block may be scrambled or otherwise encoded using a reversible algorithm based on the current value of the encoding pad 216. In the illustrative embodiment, in block 308 the server 102 maps each input byte value to an output value using a corresponding value stored in the encoding pad 216. For example, the encoding pad 216 may be embodied as a 256-byte array or other lookup table that stores all possible byte values (e.g., values from 0 to 255) in some order. All values in the encoding pad 216 may be unique with no repeats. The server 102 indexes the encoding pad 216 with the input byte value and then outputs the value of the encoding pad 216 at that index. Thus, the server 102 may encode the entire input data block and generate the encoded block.

In block 310, the server 102 generates a hash value based on the contents of the encoded data block. The server 102 may perform any cryptographic hash algorithm to generate the hash value. Illustratively, the server 102 performs a SHA-512 hash algorithm and generates a 512-bit hash value.

Figure 4:
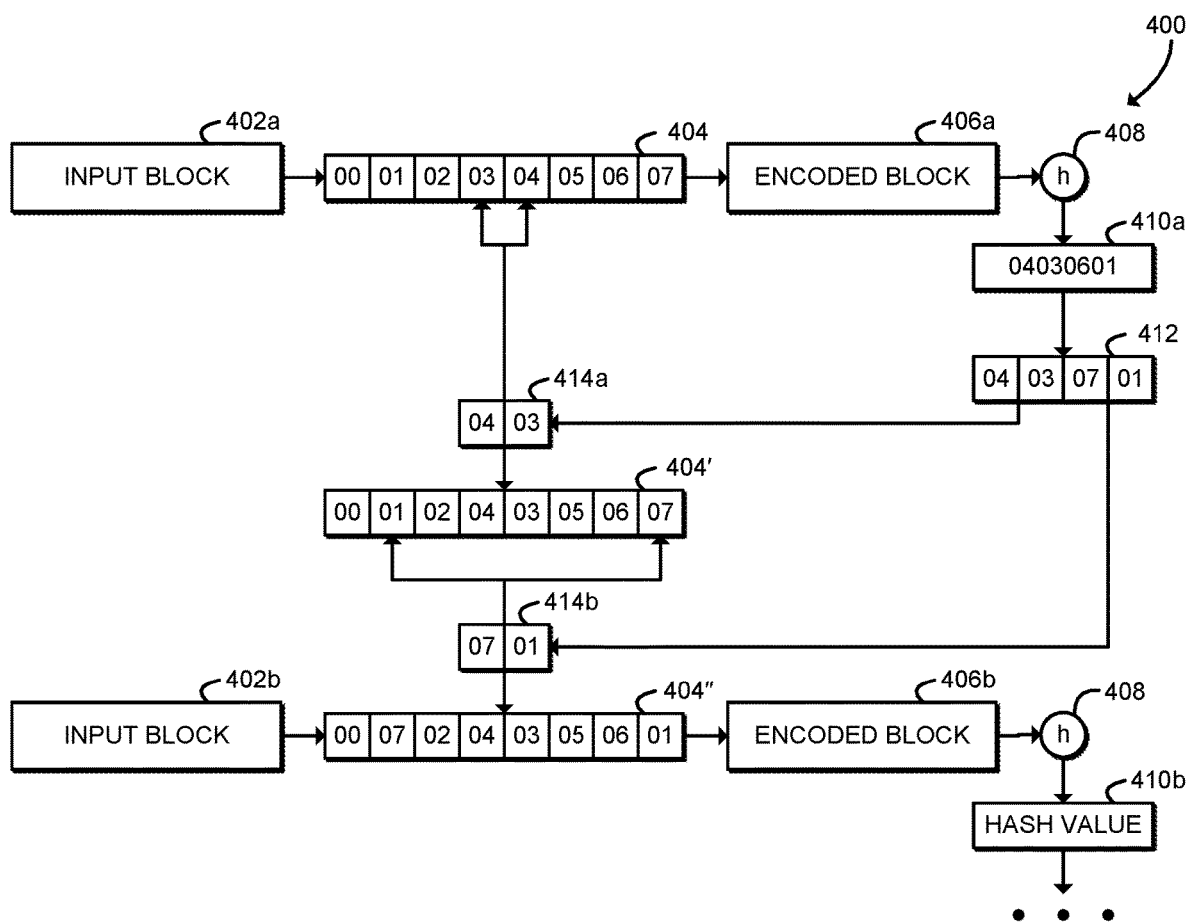
FIG. 4 is a schematic diagram illustrating at least one embodiment of a method for encoding an input block that may be executed as a part of the method of FIG. 3.

In block 312, the server 102 modifies the encoding pad 216 based on the hash value. The server 102 may apply one or more secure hash algorithm instruction rules to modify the encoding pad 216 based on the contents of the hash value. By modifying the encoding pad 216 based on the hash value, state of the system 100 is permanently changed, and the transformation applied to future input blocks (and thus the content of future data blocks) depends on the content of the current encoded data block. Thus, modifying the encoding pad 216 based on the hash value ties the encoded block values together into a blockchain. Additionally, because the hash value is generated by a cryptographic hash algorithm, its value cannot be predicted by selecting a particular input data block. Accordingly, it is not possible to force the encoding pad 216 to have a particular value by carefully selecting an input data block. In the illustrative embodiment, the server 102 modifies the encoding pad 216 by swapping selected bytes within the encoding pad 216 (i.e., permuting the encoding pad 216). In the illustrative embodiment, in block 314 the server 102 converts the 512-bit hash value to a sequence of 64 bytes. In block 316, for each of 32 pairs of the 64 bytes, the server 102 indexes the encoding pad 216 at the locations identified by the pair of bytes and swaps the values included at those locations. An example of the encoding and modification process is shown in FIG. 4 and described further below.

In block 318, the server 102 stores the encoded block and corresponding hash value as a block on a blockchain. The blockchain data 218 may be stored in distributed storage or otherwise stored in multiple locations. In some embodiments, the server 102 may perform one or more cryptographic operations to tie the encoded data block to previous blocks on the blockchain. As part of storing the encoded block on the chain, the server 102 may include one or more additional metadata fields or other information. For example, the server 102 may generate a header for the encoded data block, a time stamp, a block number or other identifier, additional hash values, or other data.

In some embodiments, the server 102 may store the encoded data block in a cycled chain. Cycled chains may used for temporarily recording data on the blockchain in situations that that might otherwise require undue storage to maintain a permanent record of that same data. For example, a user may choose to record surveillance footage from a camera directly into the blockchain of the system 100 in order to prove, in a court of law, the originality of the footage and the accuracy of its time-stamp. However, if no incident occurs on that premises over a period of sixty days, the user may choose to cycle-out that footage. Any data desired to be stored permanently can be moved to a permanent chain within the same network. As another example, an organization may desire to create a User Log to temporarily track a broadened level of user activity within the network. For example, a cycled chain could be used to track all permissioned read operations within an organization, in case it is needed for purposes of an in-house security review. As another example, an organization may log, for a specific period of time, the more mundane read or write operations conducted by IoT devices that are connected within the network. This allows an exhaustive tracking of device activity on a temporary basis, while reserving longer term storage for only the more critical data points (e.g., key instrument readings).

In block 320, the server 102 returns instructions to the client device 104 providing access to data stored in the blockchain. For example, the server 102 may return the hash value or other information indicative of the encoded data block (e.g., block number, address, or other identifying information). After returning to the client device 104, the method 300 loops back to block 304 to continue adding input data blocks to the blockchain.

Referring now to FIG. 4, diagram 400 illustrates one potential embodiment of the block encoding and encoding pad modification processes performed by the method 300 of FIG. 3. As shown, an input data block 402a is encoded using an encoding pad 404 to generate an encoded block 406a. For illustrative purposes, the encoding pad 404 is an eight-byte array; however, as described above, in many embodiments the encoding pad 216 is a 256-byte array. The encoded block 406a is hashed using the hash function 408 to generate a hash value 410a. The hash value 410a is illustrated as a 32-bit value represented as a string of hex values that are each less than 08; of course, in other embodiments the hash value may be a 512-bit value or other hash value.

As shown, the hash value 410a is converted to a sequence 412 of byte values. A pair 414a of byte values are selected from the sequence 412. The pair 414a of byte values are used to index the encoding pad 404, and the pad values at those indices are swapped to generate a modified encoding pad 404'. For example, in the illustrative embodiment, bytes in the 04 position and the 03 position of the encoding pad 404 are swapped to generate the encoding pad 404'. Similarly, the next pair 414b of byte values are selected from the sequence 412 of byte values, and that pair 414b of byte values are used to index and swap values in the modified encoding pad 404' to generate further modified encoding pad 404". For example, bytes in the 07 position and the 01 position of the encoding pad 404' are swapped to generate the encoding pad 404". Similar swaps may continue for all pairs 414 of bytes in the sequence 412. For example, in embodiments with a 512-bit hash value, the encoding pad 216 may be modified with swaps for 32 pairs of bytes.

After modifying the encoding pad 404", another input data block 402b is encoded using the encoding pad 404" to generate an encoded block 406b. The encoded block 406b is hashed using the hash function 408 to generate a hash value 410b. The encoding pad modification process may then continue for processing additional input blocks. Accordingly, because the encoding pad and the hash value are tied together, any mutations may be detected automatically on a server-by-server basis.

Although illustrated as using the hash value to index and swap values in the encoding pad, it should be understood that in other embodiments one or more other secure hash algorithm instruction rules may be used to modify system state based on the hash value. For example, the instruction rules may include function calls (e.g., mapped 0-255 in a switch/case statement), interactions with hidden elements of the system 100, setting of logical flags for the next input into the system 100, or other rules. As an example, an illustrative secure hash algorithm instruction rule may be, "For the SHA-512 of an input text, capitalize all letters in the input text at the 'position' pointed to by each byte of the SHA-512 hash. If the hash byte is out of range, ignore that byte. If the input character is a space, change it to an underscore."

Figure 5:
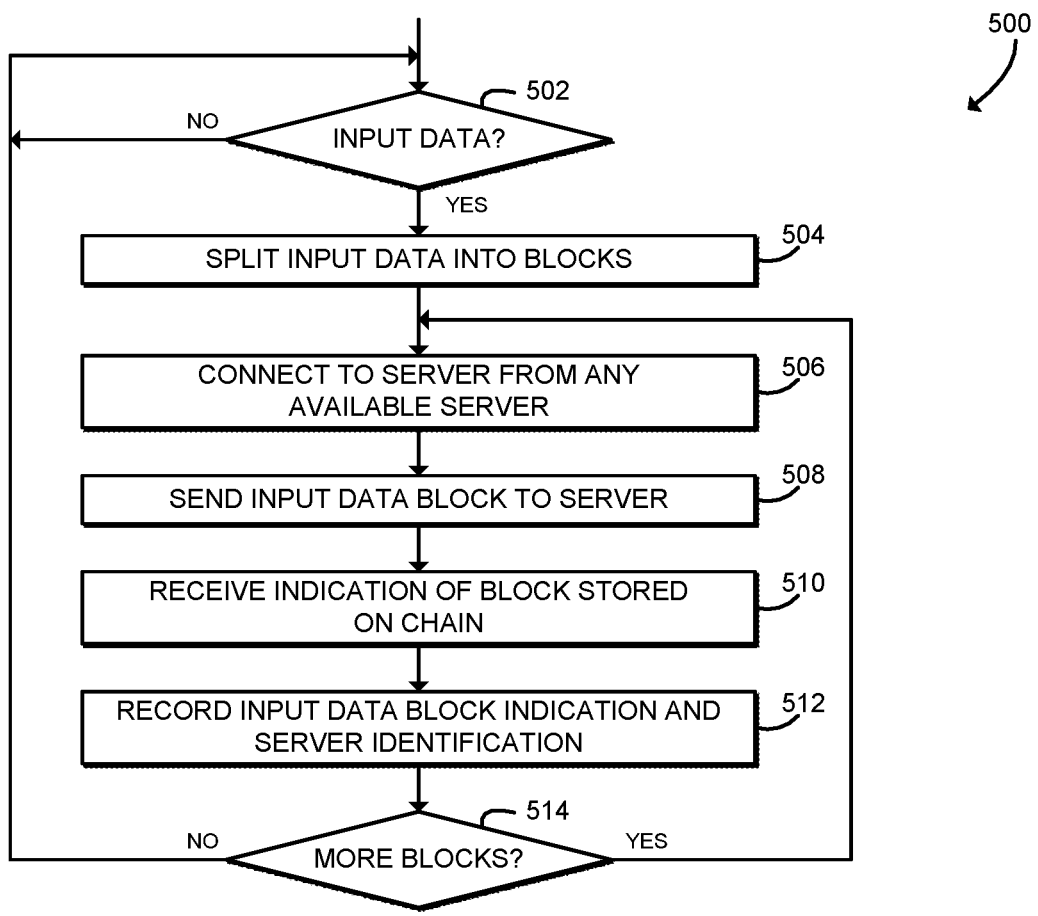
FIG. 5 is a simplified flow diagram of at least one embodiment of a method for adding input data to a blockchain that may be executed by a client device of FIGS. 1 and 2.

Referring now to FIG. 5, in use, a client device 104 may execute a method 500 for adding an input block to a blockchain. It should be appreciated that, in some embodiments, the operations of the method 500 may be performed by one or more components of the environment 240 of the client device 104 as shown in FIG. 2. The method 500 begins with block 502, in which the client device 104 determines whether input data exists for submission to a server 102. The input data may be, for example, a data file, a message, a request, a command, or any other submission to a server 102 for recording on the blockchain. If no input data exists, the method 500 loops back to block 502 to continue monitoring for input data. If input data exists, the method 500 advances to block 504.

In block 504, the client device 104 splits the input data into one or more fixed-sized blocks. Illustratively, each of the blocks is 1500 bytes in size; however, in other embodiments, each block may be from about 0.1 kB to about 10 kB, from about 0.5 kB to about 5 kB, from about 1 kB to about 2.5 kB, or any other appropriate size.

In block 506, the client device 104 connects to a server 102 from a group of available servers 102. The client device 104 may use any appropriate technique for selecting a server 102 from the available servers 102. As described above, the blockchain data 218 may be stored in multiple locations; thus, each input data block generated by the client device 104 may be stored with any server 102 of the available servers 102. Accordingly, the client device 104 may randomly select a server 102 from the available servers 102. To connect to the server 102, the client device 104 may establish a virtual private network (VPN) or other secure data connection with the server 104. The VPN may be secured using a user certificate 258 available to the client device 104.

In block 508, the client device 104 sends the input data block to the server 102. The server 102 encodes the input data block and then stores the encoded data block to a blockchain, using the method described above in connection with FIG. 3. After the block is stored on the chain, in block 510 the client device 104 receives an indication of the block stored on the chain. The indication may be embodied as or otherwise include a hash value, a block number, a web address or other block identifier associated with the encoded data block stored on the blockchain.

In block 512, the client device 104 records the indication of the input data block and an identification of the server 102. For example, the client device 104 may store a hash value associated with the block and a networking address associated with the server 102. Those recorded values may be used by the client device 104 to verify or otherwise access data stored on the blockchain. The client device 104 may, for example, regenerate a map of servers 102 and associated input data blocks stored on the blockchain.

In block 514, the client device 104 determines whether additional input data blocks of the input data remain for processing. If so, the method 500 loops back to block 506 to continue connecting to servers 102 and uploading input blocks. If no additional input blocks remain, the method 500 loops back to block 502 to continue monitoring for input data.

As described above, multiple client devices 104 may be in communication with multiple servers 102. An example of the system 100 according to one embodiment is illustrated in FIG. 1. According to the present example, the client devices 104 contact servers 102 to upload a file to a distributed chain. Each server 102 utilized in the exemplary system 100 handles requests from multiple client devices 104 at the same time, returning to the client device 104 instructions for how to retrieve the respective data from the chain.

For example, and as shown in FIG. 1, client device 104a maintains connections to all three available servers 102a, 102b, 102c, and client device 104b maintains connections to servers 102b, 102c. Server 102a thus serves one client device 104a, while servers 102b, 102c serve two client devices 104a, 104b. Each client device 104 maintains a list of the machines/devices 102 that each client device 104 had contacted, and what bytes the client device 104 has sent. For example, the client device 104a may maintain a list as shown in Table 1, below, and the client device 104b may maintain a list as shown in Table 2, below.

TABLE 1

List maintained by client device 104a.

| File | Byte Range and Server |
|---|---|
| Test1.txt | Bytes 0 to 500 are on server 102a, bytes 501 to 1000 on Server 102c, and bytes 1001 to 1325 on Server 102a |
| Test2.txt | Bytes 0 to 500 are on server 102b, bytes 501 to 1000 on server 102b, and bytes 1001 to 1325 on Server 102a |

TABLE 1

List maintained by client device 104b.

| File | Byte Range and Server |
|---|---|
| Test1.txt | Bytes 0 to 500 are on server 102b, bytes 501 to 1000 on server 102c, and bytes 1001 to 1325 on server 102b |
| Test2.txt | Bytes 0 to 500 are on server 102b, bytes 501 to 1000 on server 102b, and bytes 1001 to 1325 on server 102b |
| bigFile.txt | Bytes 0 to 100000 on server 102c, bytes 100001 to 120000 on server 102b |

According to this example, each server 102a, 102b, 102c maintains the following: (i) a list of blocks written; (ii) instructions where to write the next block in the chain; (iii), and a corresponding secret encoding pad 216. Assuming that only the letters A-F existed, the secrets of the servers 102, for purposes of this example, were as follows: Server 102a: ACDFEB; Server 102b: CADFBE; Server 102c: FECADB.

According to the present example, when the client device 104 has a file to upload (or a free form text message), the client device 104 contacts a server 102 and uploads data, typically in chunks. As illustrated, the system servers 102 may not accept a size greater than 1425 bytes total in a single transaction, however, this size may vary. According to the present example, other servers 102 in the network were not aware of these transactions between a single client device 104 and a server 102. In addition, other client devices 104 were not informed of the activity on the server 102. According to an alternative embodiment, thousands of other clients 104 could exist transparently to a client 104, and whole parts of the total cloud infrastructure of the servers 102 could be hidden, as server 102a is hidden from client 104b as illustrated in FIG. 1.

Data block processing may be implemented with an efficient multithreaded architecture. In an illustrative embodiment, on the server 102 side, independent connections to the server 102 are all fed into a single "packet scheduling" function which processes packets one by one sequentially. Each packet is assigned a unique packet ID upon receipt from the client device 104, which determines its order in the processing queue. Once a packet is selected for processing, the scheduling function applies the block encoding algorithm as described above to the current state of the chain and sends an appropriate response packet to the client device 104. If the packet queue is exhausted, the server 102 naturally returns to an idle state without further user intervention.

In that illustrative embodiment on the client 104 side, two threads are created for each server 102 connection. The first is a "send" thread. The send thread sends packets to the server 102 in one of three modes: "allocate," "write," or "read." This send thread is temporary, created by the client program based on user commands. The second thread is a "receive" thread, which is permanent for the duration of the client program. An array of counters for each connection ensures that for each sent packet from the temporary threads, a corresponding response is received from the server in the permanent thread. In this way, the "sends" and "receives" are independent and contained in their own threads, which may lead to improved network performance overall.

On both the client 104 and the server 102 side, "orientation" data may be included as a header in each packet sent or received. This method ensures that both the client 104 and the server 102 will be able to process a packet regardless of when it is received in time. This asynchronous data is specific to each packet type (e.g., "allocate," "write," and "read"), and may be ignored in some use cases. The orientation data slightly reduces how much useful data fits into each packet.

Upon server 102 creation, two simple counters are created. The first tracks the total number of packets received by the server across all client 104 connections (each client connection has its own thread). The second counter counts how many packets have been processed through the block encoding algorithm by the packet scheduler. In this way, the first counter keeps track of global thread activity (calls into the packet scheduling function) and the second counter keep track of resolutions (work done by the single packet scheduling function).

As described above, each packet when received by the server 102 is assigned an ID (the current total packets received), putting the received packet below the packets which were received before, which would by definition have a lower ID if received first in time. The receiving thread calls the packet scheduling function with three pieces of data: (1) the new packetID (current global packet count); (2) the socket which sent the packet (for a server response); and (3) the packet itself (entire packet). Once the function is called, the thread returns to waiting for new packets.

The processing function begins by the server 102 testing whether the queue is empty (currentPacket==totalPackets). If so, the function immediately returns, as no work remains in the queue. If the queue is not empty, the function checks whether the calling packet ID matches the currentPacket counter. If no, the function simply calls itself again with the same failed parameters, which will eventually succeed as the queue empties. If the current packet counter matches the ID, the block encoding algorithm is performed and the currentPacket counter is incremented by one. In this way, the next packet ID becomes valid within the scheduling function. Part of the block encoding algorithm is a response to the client 104, which happens before the current packetID is relinquished to the next packet in the queue.

Upon client 104 creation, two counters are created for each connection (thread): a sent counter and a received counter. Also, a thread is created on each open socket which only listens for received packets from the server 102. This receive thread has logic for "allocate," "write," and "read" packets sent from the server 102. The write response may be discarded by the client 104, as it is a server-side operation. When the user sends or receives a file or free-form text data from the server 102, a temporary thread is created, which sends allocate, write, or read packets as quickly as possible from the client 104 to the server 102, incrementing the appropriate send packet counter for that socket. As packets are received, the received counter increments as well. Once the number of received and sent packets are equal, the temporary thread terminates and the user's operation is complete. A single client session or client command may be executed by multiple temporary threads, but the single receive thread never terminates.

Figure 6:
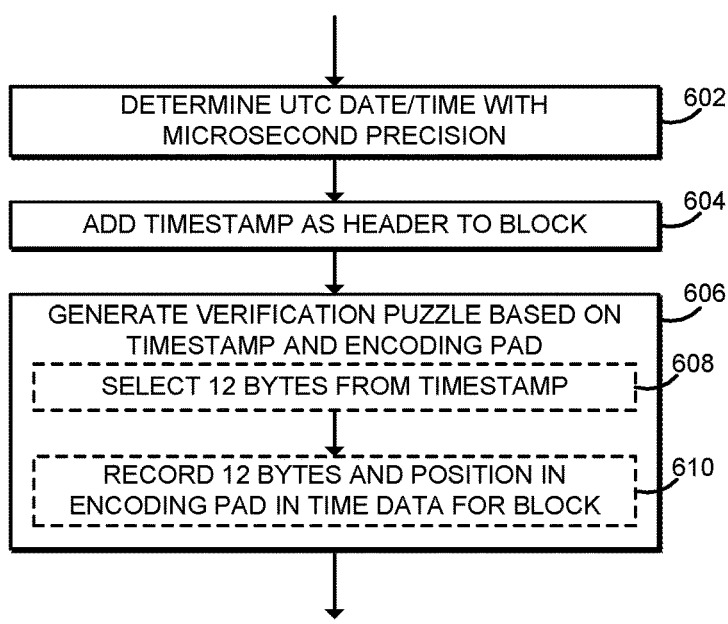
FIG. 6 is a simplified flow diagram of at least one embodiment of a method for generating a timestamp for a block that may be executed by a server of FIGS. 1 and 2.

Referring now to FIG. 6, in use, a server 102 may execute a method 600 for adding a timestamp for a block. It should be appreciated that, in some embodiments, the operations of the method 600 may be performed by one or more components of the environment 200 of the server 102 as shown in FIG. 2. The method 600 may be executed, for example, when adding a block to the blockchain as described above in connection with the method 300 shown in FIG. 3. The method 600 begins with block 602, in which the server 102 determines a universal time coordinated (UTC) date/time with microsecond precision.

In block 604, the server 102 adds the timestamp as a header to the encoded data block. Each node of the system 100 maintains its own time, in accordance with UTC. Each timestamp is allocated at the block level (i.e., per write). The timestamp data-points are created when a block is written and represent the exact time, down to the microsecond, that the data is ingested as a blockchain record.

In block 606, the server 102 generates a verification puzzle based on the timestamp and the current value of the encoding pad 216. In some embodiments, in block 608 the server 102 may select 12 bytes from the timestamp. These are the "keys" to the puzzle, linking the timestamp and block uniquely.

In block 610, the server 102 records the 12 selected bytes and the corresponding positions in the encoding pad 216 for those bytes. A complex puzzle is added to the time-data for the block, linking the block's data and the time recorded—all 12 "keys" are tested to see which matches most closely to the block data. A "winner" of 472 such competitions defines the final link between time and data. The server 102 records those values in the timestamp data for the block. After generating the verification puzzle, the method 600 is completed. The encoded block including the timestamp may be added to the blockchain as described above. Creating this puzzle allows for an additional verification step for users privileged to run the "verification" program on the server-side or as an administrator of the system 100. If desired, the administrator can restrict access to the time-stamp "verification" program and, instead, share with a user the "raw timestamp." A user whose permission is limited to the "raw time-stamp" may only be enabled to read the UTC time and microsecond counter assigned to the requested block.

The time-stamps also make it possible for users to traverse the blockchain via a "binary search tree" function. To use this function, a user may input a particular time and/or day and that input will then be converted to UTC time, which is then used to pull up all blocks selected within that timeframe.

Figure 7:
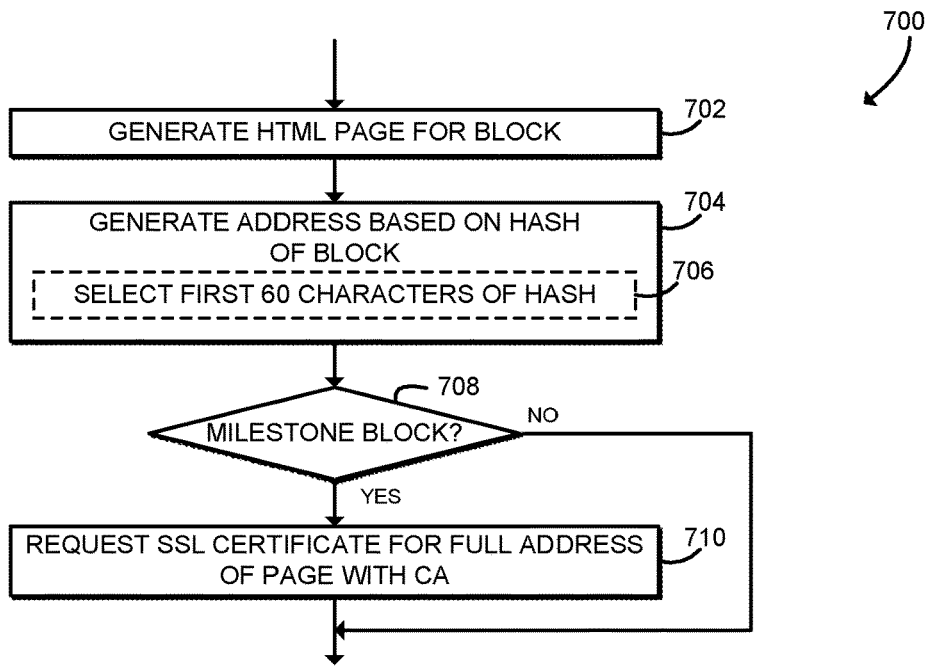
FIG. 7 is a simplified flow diagram of at least one embodiment of a method for generating an additional immutable record for a block that may be executed by a server of FIGS. 1 and 2.

Referring now to FIG. 7, in use, a server 102 may execute a method 700 for generating an additional immutable record. It should be appreciated that, in some embodiments, the operations of the method 700 may be performed by one or more components of the environment 200 of the server 102 as shown in FIG. 2. The method 600 may be executed, for example, when adding a block to the blockchain as described above in connection with the method 300 shown in FIG. 3. The method 700 begins with block 702, in which the server 102 generates an HTML web page for an encoded data block. The content of the HTML web page may, for example, include or reflect the encoded data block, the hash code, or other data.

In block 704, the server 102 generates an address based on the hash value for the encoded data block. In some embodiments, in block 706 the server 102 selects the first 60 characters of a string representation of the hash value as part of the address. The server 102 may select any predetermined number of characters or other portion of the hash value that is large enough to be infeasible to predict.

In block 708, the server 102 determines whether the encoded data block is a milestone block. For example, the server 102 may identify a milestone block after every 10, 100, 1000, or another predetermined number of encoded data blocks have been added to the blockchain. The number of blocks between milestone blocks may depend on the volume of data processed by the system 100. If the encoded data block is not a milestone block, the method 700 is completed. The encoded data block may be added to the blockchain and the corresponding web page may be published. If the encoded data block is a milestone block, the method 700 proceeds to block 710.

In block 710, the server 102 requests a secure sockets layer (SSL) certificate for the full address of the web page for the encoded data block from a trusted third-party certificate authority (CA). The CA then issues a certificate that is bound to the address of the website and is thus bound to the hash value of the encoded data block. Although the illustrative embodiment requests a CA SSL certificate, it should be understood that in other embodiments, any certificate bound to the full address of the web page associated with the block and issued by a publically vetted CA may be used. Accordingly, the CA certificate provides assurance from a third party of the hash value. This assurance of the hash value may not be feasibly modified or falsified, thereby providing an additional immutable record of encoded data block on the blockchain. Thus, it becomes mathematically impossible for even administrators of the system 100 to change a blockchain record. This method provides an additional layer of immutability that has no reliance upon traditional blockchain architecture or peer-to-peer networking. In other words, given that any subsequent change to blockchain data (which could only occur at the system administrator level, given automated mutation tracking) would create a discrepancy between the hash value stored on the blockchain and the hash values recorded in the CA SSL certificates.

Figure 8:
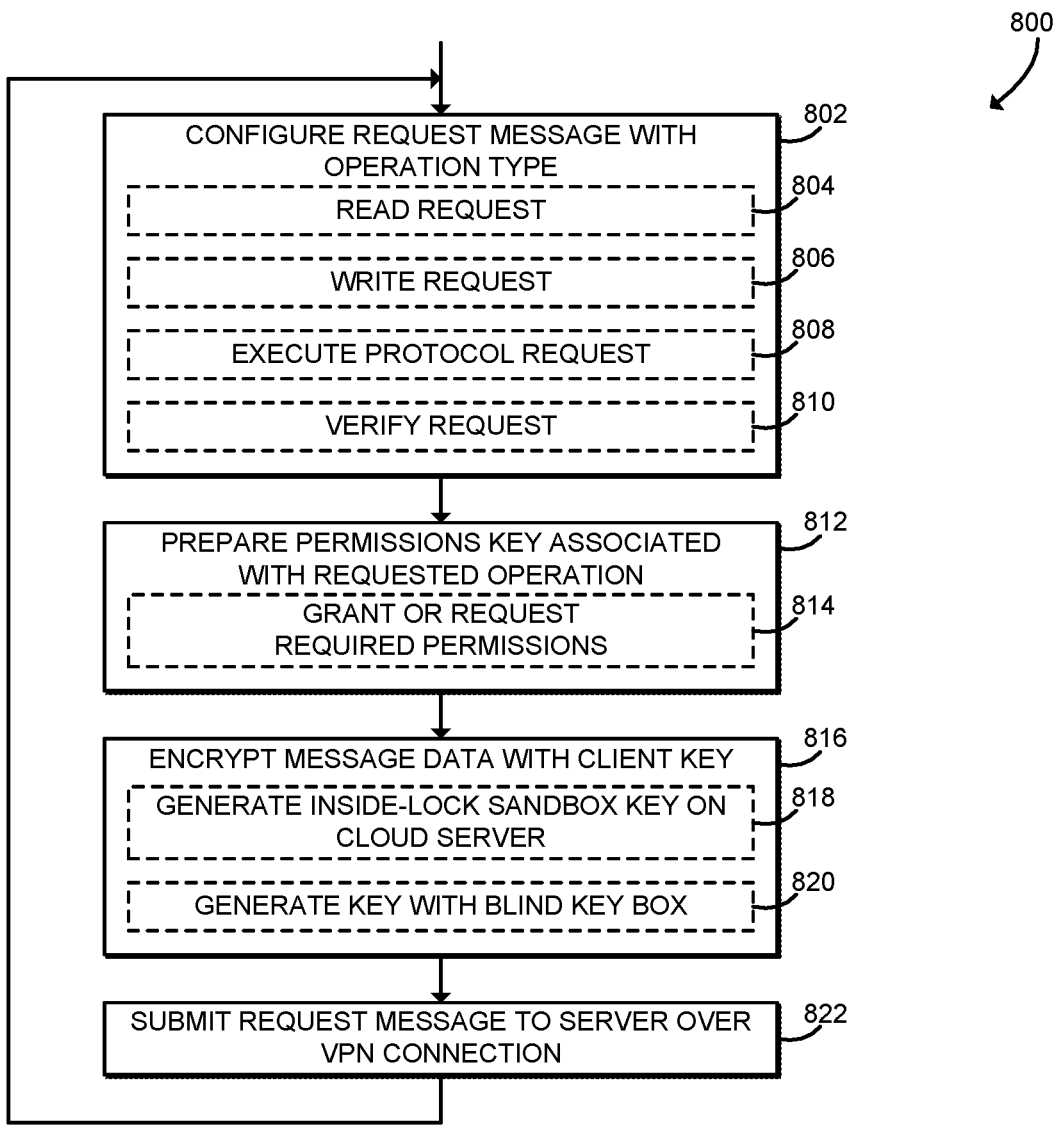
FIG. 8 is a simplified flow diagram of at least one embodiment of a method for submitting secure permissioned request messages to a server that may be executed by a client device of FIGS. 1 and 2.

Referring now to FIG. 8, in use, a client device 104 may execute a method 800 for submitting secure permissioned request messages to a server 102. It should be appreciated that, in some embodiments, the operations of the method 800 may be performed by one or more components of the environment 240 of the client device 104 as shown in FIG. 2. The method 800 may be executed, for example, to prepare input data for submission to one or more servers 102 for storage or other operations on the blockchain. The method 800 begins with block 802, in which the client device 104 configures a request message with an operation type. In some embodiments, in block 804 the client device 104 may configure a read request. The read request may identify an encoded data block stored on the blockchain.

In some embodiments, in block 806 the client device 104 may configure a write request. For example, the write request may include source code, binary machine code, or another data file. With no limitations on the number and/or contents of encoded data blocks, a framework is created for completely tailored protocol execution that can be a codebase of any size and of any code language.

In some embodiments, in block 808 the client device 104 may configure an execute protocol request. Through storage of source or machine code as blocks within the blockchain, code can be executed as protocols sent to the chain, rather than directly interacting with an executable file or through an interpreter. With this code storage technique, distributed code is thus rendered completely immutable. Additionally, the system 100 introduces an enhanced form of invocation tracking for all code or protocols stored on the chain. Invocation in this sense is defined as the execution of any compiled or uncompiled encrypted code via an execute protocol request sent to the server 102 and stored on chain as an encoded data block, in which the data is a reference to code elsewhere on the chain to be executed. This is distinct from the traditional notion of code execution in a GUI or command line interface. Thus, this process of invocation allows for the signature history (e.g., a permissions key generated as described below in connection with FIG. 9) to be stored and tracked in an immutable fashion, alongside the rest of the data in the blockchain. Additionally, the system 100 provides a more expansive chain code execution system than typical implementations of "smart contracts." In some embodiments, in block 810 the client device 104 may configure a verify request. The verify request may identify an encoded data block for verification.

Thus, the contents of a highly sensitive codebase by which a server or other application runs on a blockchain can be stored. All interactions with the server 102 are mediated by the block encoding system, ensuring that the call/return nature of a request to the server 102 is impossible to tamper with, and rendering impossible an attempt to insert malicious code into the codebase. Accordingly, the system 100 disclosed herein may be utilized for the distribution of software from one entity to another. The software's final executable code may be encrypted within the blockchain system before distribution, ensuring immutability from provider to recipient. This software could be run through protocol invocation on the blockchain, providing traceable records of software use. In order to minimize the potential for changing the underlying codebase (depending on client security needs), updating the codebase in either situation could be achieved through creation of a new blockchain with updated codebase or through the addition of code update blocks from configurable authorized users.

Figure 9:
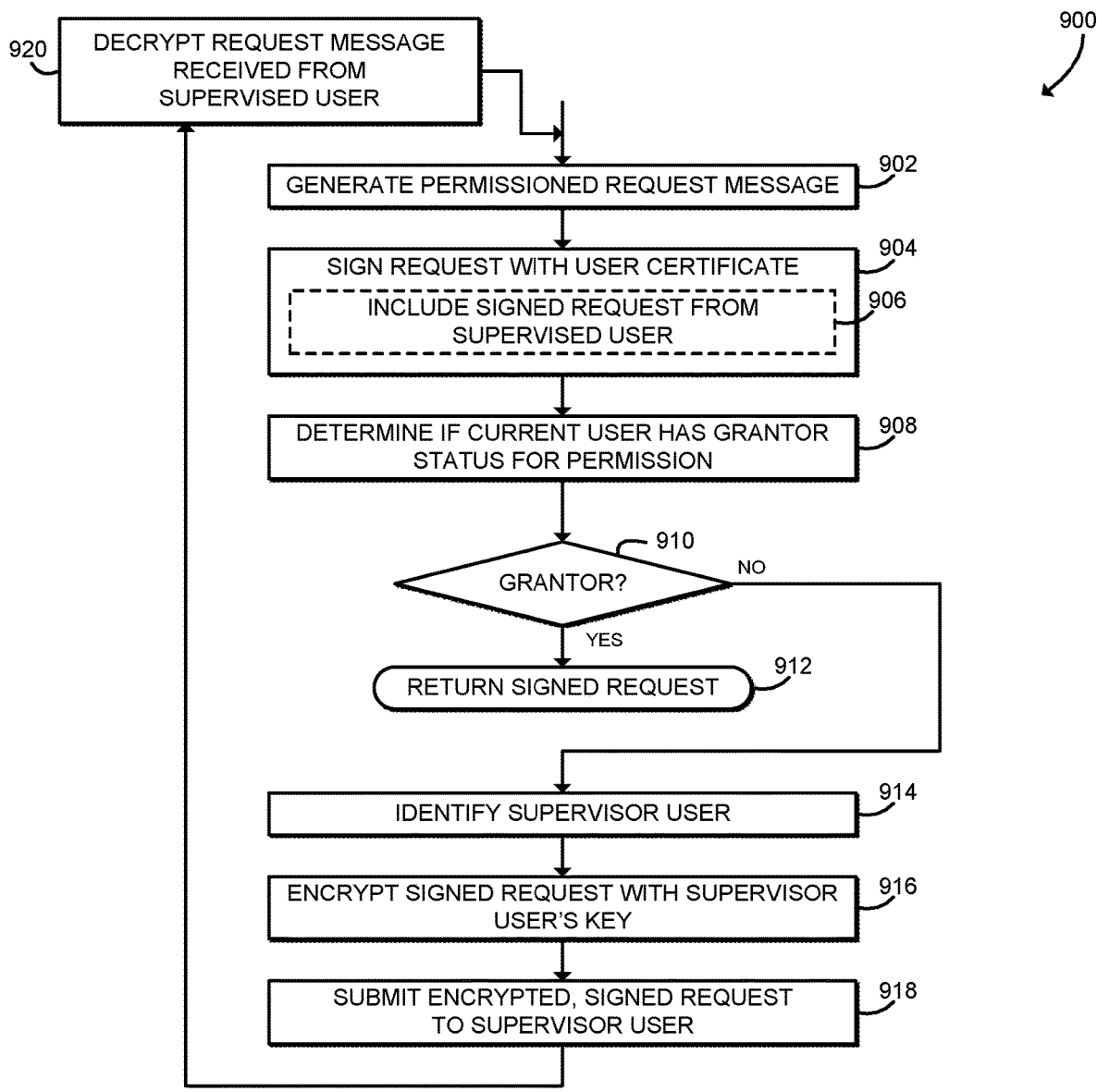
FIG. 9 is a simplified flow diagram of at least one embodiment of a method for generating a permissions key that may be executed by a client device of FIGS. 1 and 2.

In block 812, the client device 104 prepares a permissions key associated with the requested operation. The permission key may be used by the server 102 to determine whether the user is authorized to perform the requested operation. The permission key may be embodied as a message that has been signed by one or more user certificates. In some embodiments, in block 814 the client device 104 may grant the required permission or request the required permission from another user who is authorized to grant the required permission. The client device 104 may, for example, execute a method for preparing the permission key as shown in FIG. 9 and as described further below.

In block 816, the client device 104 may encrypt message data associated with the request message using the client key 260 or otherwise protect the message data. The client device 104 may use any private key, session key, symmetric key, or other encryption technique to encrypt the message data. As described above, the server 102 may not need to access the plaintext contents of the input data in order to generate an encoded data block and store an immutable record of the input data on the blockchain. Accordingly, the message data (e.g., data files or other data) may be encrypted and thus protected from access by the server 102. As described above, the client device 104 may use any client key 260 for encrypting the message data.

In some embodiments, in block 818 the client device 104 may generate an inside-lock sandbox key using a cloud server. In some embodiments, in block 820 the client device 104 may generate a key using a blind key box.

Typically, in a Software-as-a-Service (SAAS) context, a sandbox may be created to protect the SAAS source-code and to restrict customer access generally to only those aspects of the SAAS that are necessary for the customer to make use of the software, as intended. However, the inside-lock sandbox established with the system 100 may not be used just used to protect safety of the system 100, but also the safety of customer privacy. To accomplish this, the customer has the option of using the SSH-keygen function within the cloud server(s) dedicated to the customer's use. The default is a null-key but the customer is able to use that SSH-keygen function to generate a key that will lock their sandbox from the inside. This will prevent system administrators of the system 100 from being able to access customer data or to decrypt the customer blockchains. Additional sandboxes may be recursively generated, for example to allow a customer to repackage the system 100 to other customers (e.g. for e-commerce or smart devices, etc). A user may grant permissioned access, on a temporary basis, to a system administrator or other entity in order to access the customer blockchain, for example to obtain technical support.

In at least one embodiment, a "BlindKey Box" is an inside-lock sandbox that has special authority to issue official secret keys by either a SAAS-ware customer or SAAS-ware administrator, where neither the administrator (nor the customer) is able to see the key being transmitted. Moreover, information can be transmitted between parties, via a BlindKey Tunnel, opened by the BlindKey Box. Such blind key generation and secure tunnel management may allow parties to work together effectively, while maintaining secrecy of state with one another.

In some embodiments, a BlindKey Wallet is another inside-lock sandbox: one that is designed to help users manage their identity, when interacting with others. A Blindkey Wallet allows a User to store a set of BlindKeys, where each BlindKey is being stored for a different purpose. By using the Blindkey Wallet, in conjunction with other data privacy technology to limit one's digital fingerprint, a User can manage how their data is tracked. For example, a User may choose to use the same BlindKey for all eCommerce Vendors, or may choose to use a different BlindKey for each Vendor (or each category of Vendor). As this technology gains adoption, it then becomes incumbent upon the Vendor to incentivize Users to re-use the same BlindKey, to initiate a relationship with them—one with a mutually beneficial give-and-take, when sharing information.

In some embodiments, a BlindMessage Box allows users to place data in an inside-lock sandbox, where another User can process that data (without actually having any access to the data). The two Users agree, on the front end, as to what algorithm will be run (e.g., an API Call from a library that has been vetted by a trusted third party). The data will then be formatted in accordance with the requirements of that API, and then will be submitted to the BlindMessage Box as input. This allows the data-providing User to protect the privacy of their data and, when a mutually agreed upon API Call is used, both parties can have a "meeting of the minds"

as to how exactly that data will be managed/processed by the data-receiving User. As an example, private, non-healthcare companies have been criticized for warehousing sensitive health-related data (e.g., consumer genetic testing/genealogy companies have been criticized for harvesting and monetizing their customers' genetic information). Such issues can be avoided if a trusted third party were to vet the algorithms used by that company to process genetic data, while allowing customers to use a BlindKey Tunnel to submit their private healthcare data to a BlindMessage Box that is running the pre-approved API.

In block 822, the client device 104 submits the request message to one or more servers 102 over a VPN connection. The client device 104 may split the request message into one or more input blocks and submit those blocks as described above in connection with FIG. 5. As described above, the connection between a client device 104 and the servers 102 is by VPN, a virtual point-to-point connection through the use of tunneling protocols. This also applies to all connections between client devices 104 within the system 100 context. While the interface may create the impression that a client 104 is linking to another client 104 directly, the servers 102 of the system 100 always serve as the hub. This likewise extends to any automated devices (e.g. IoT devices) that might be connected to the system 100 as clients 104. As a result, all client 104 networks on the system 100 may have a star configuration to ensure that all data, once it enters a VPN tunnel (where it is initially encrypted), will have no vulnerability to being intercepted by a third party once it exits the tunnel. After exiting the tunnel, that data is decrypted securely within the system 100, and then that data will either be written directly to an encoded data block on the blockchain, or the transmitted message will operate as a command to the system 100, to be executed by a server 102, depending upon the user's permission-level. All VPN Tunnels may be secured by a certificate 258, either Self-Signed or issued by a Trusted Certificate Authority. This certificate 258 may allow all "write operations" to be secured by a digital signature, linked to that certificate 258. That digital signature may then be added to the block data to store the identity of the person who performed the write operation. This system 100 may also be used to store digital signatures for read operations and network configuration activity. After submitting the request message, the method 800 loops back to block 802, in which the client device 104 continues configuring request messages.

Referring now to FIG. 9, in use, a client device 104 may execute a method 900 for generating a permissions key. It should be appreciated that, in some embodiments, the operations of the method 900 may be performed by one or more components of the environment 240 of the client device 104 as shown in FIG. 2. The method 900 may be executed, for example, when configuring a request message as described above in connection with FIG. 8. The method 900 begins with block 902, in which the client device 104 generates a permissioned request message. The permissioned request message may, for example, identify a particular permission or otherwise include information identifying the permissioned request.

Permissions may be administrator-defined at the network configuration stage and thus may it be open-ended, during network configuration, as to how permissions are defined and assigned to users within a given network. Some individual permissions may be hierarchical to one another, whereas others may have a lateral relationship to one another. This will vary from permission to permission, and from network to network. Illustratively, a hierarchical difference in this system 100 is the difference between a grantee of permissions, a grantor of permissions and a system administrator.

A grantee of a permission may have clearance that is specifically tied to a particular permission. For example, an entire chain, an entire block, or a line/set of lines of data in a given block may be permissioned in such a way that will only allow a user with that permission to read that information. However, in addition to read functions, permissions can also be extended to write functions and network configuration functions. This system of signatures and permissions may also be used outside the blockchain system 100 context for use more broadly.

A grantor of a permission may have authority to grant another person a permission on a one-time basis. This is distinct from a system administrator, who generally retains authority to change user access, as needed, including user permissions or user status as grantor. Such activities by a system administrator will generally be recorded as a network configuration function, recorded to a block with the system administrator's own digital signature. The activities of a grantor with regard to a grantee may be tracked and stored via the permissioned request message.

In block 904, the client device 104 signs the permissioned request using a user certificate 258. In some embodiments, in block 906 the client device 104 may also sign a previously-signed request message received from a supervised user. As described further below, users may submit signed requests to their supervisors in a hierarchical system in order to be granted additional permissions. Of course, if a user determines not to grant the requested permission, the client device 104 may not sign the permissioned request. In those circumstances, the method 900 may terminate with an error or other indication that the request was not granted.

In block 908, the client device 104 determines whether the current user (associated with the user certificate 258 used to sign the permissioned request) has grantor status for the permission associated with the permissioned request. A network administrator or other authority associated with the server 102 or associated organization may determine which users are authorized to grant particular permissions (e.g., read, write, or execute permissions). Those users are provided with grantor status for those authorized permissions. Grantor status, grantee status, and other permissions may be configured with one or more licenses associated with the user certificate 258.

In block 910, the client device 104 checks whether the user has grantor status. If so, the method 900 advances to block 912, in which the signed permissioned request is returned. The signed request may be returned, for example, to a supervised user or other entity that requested the permission. After the signed permissioned request is returned, the method 900 is completed. The signed permissioned request may be submitted to as server 102 as a permissions key for an associated requested operation.

Referring back to block 910, if the current user does not have grantor status, the method 900 branches to block 914, in which a supervisor user is identified. The supervisor user may be identified using a hierarchical permission structure or other organizational structure. The supervisor user may have grantor status for the requested permission, or another supervisor user in the hierarchical structure may have grantor status for the requested permission.

In block 916, the client device 104 encrypts the signed permissioned request message with a key associated with the supervisor user. Encrypting the message may protect its contents and ensure that only the supervisor user is capable of accessing and signing the message. In block 918, the client device 104 submits the encrypted, signed permissioned request message to the supervisor user. The encrypted message may be, for example, provided to the supervisor user at the current client device 104 or a different client device 104.

After submitting the encrypted message, the method 900 branches to block 920, in which a client device 104 associated with the supervisor user decrypts the encrypted message received from the supervised user. After decrypting the message, the method 900 proceeds to block 902, in which the client device 104 may generate and sign the permissioned request message using the user certificate 258 of the supervisor user. The method 900 may continue processing permissioned request messages until a user with grantor status for the permission signs the permissioned request message. Accordingly, the client device 104 may generate a permissioned request message that is wrapped with signatures from a hierarchical chain of users, indicating approval of the permission from each user in the chain.

Thus, the permissioned request message system described connection with FIG. 9 may allow for an organization to create a secure, immutable record of how permissioned information is disseminated. Additionally, the system also may tracks the ordered authorization of permissioned activities.

As described above, the permissions key "snowballs" in a manner similar to "onion routing," in which each successive user signs a message using either public key or symmetric block cryptography, with the ability to add to the message as it goes along. For example, the permissions key may track situations where multiple parties must give assent, such as smart contracts. The permissions key may also be helpful in tracking system issues, by recording the signatures and permissions of persons involved in activities being monitored within the system.

As a specific example, user A signs a message "message1" with his or her key "example1" to generate signed message "message1_example1." The same message may be encrypted further with user B's key "example2" to generate "message1_example1_example2." Another message "message2" may be signed by user B to generate "message2_example2_message1_example1." Thus, the "snowball" permissions key grows as each message is added. This permissions key may be useful in reviewing activities recorded on a chain by allowing an auditor to also review the integrity of the permissioning process.

Within the context of the system described above in connection with FIG. 9, the permissions key is relevant to the process of granting a user permission, on a one-time basis, to access permissioned block data or perform some other permissioned function. That request would then pass through the network hierarchy. If that user's immediate supervisor lacks grantor status for that permission, the request would continue passing through the hierarchy until it reaches the holder of that grantor status. Along the way, the permissions key would be developed, which will encode the path automatically taken by the request/message, as it is passed through the organizational hierarchy. Once the request reaches a user with the appropriate grantor status, that user will determine whether to grant the request. If permission is granted, then it would be signed with a unique permissions key which encodes the full history of the request in a way that is mathematically verifiable.

In verifying a permissions key, the initial user (i.e., the one requesting permission) may be able to use his or her own private key to automatically verify two things: (1) that the user requested that permission and (2) that the user can verify who in the hierarchical chain first received the request. That second person in the chain (if not the Grantor) will be able to verify that her or she received the message that was received (and from whom), and that user will likewise be able to verify the person to whom he or she sent the permission request. The grantor who eventually receives the request will be able to verify the person (immediately prior) who sent the request, and the grantor will also be able to verify that the grantor granted that permission. Any attempt to bypass this process (and the required hierarchical path) will be easily detected, given that a counterfeit permissions key will be patently unverifiable. The user requesting that permission will need to be able to verify the validity of their permissions key in order to proceed with using that permission. Once validated, that permissions key will also need to be permanently recorded on the network's blockchain.

The permissions key system may be used be used across user networks, within the system 100, which may be valuable in multiple ways. For example, the permissions key system may be used to securely disseminate information across networks in an orderly way, creating a secure and immutable record of the request and approval process. The process may also play a role in e-commerce, for example creating a single permissions key that tracks all the various digital signatures relevant to authorizing a transaction.

In one embodiment, this permissions key system can be used to facilitate transactions, as a FinTech application. Specifically, this system can be used to create an additional layer of transaction verification for a Smart Contract, at the key exchange level, in which of all the parties involved in a Smart Contract can be verified and stored through a single key. In configuring a Smart Contract that will utilize this technology, the parties to the contract can be predefined in order to establish a path for the permissions key, whether that path is hierarchical or arbitrary. In short, this system allows for a single key to capture a multilateral key exchange between parties to a multilateral contract, and it allows for instantaneous execution, once the final grantor/signatory completes the path defined for the key during the Smart Contract's configuration phase. This key can also be configured to store additional transactional information and can also be salted for additional security.

As another embodiment as to how this permissions key system can be used for FinTech, this permissions key system can also be used for cryptocurrency counterfeit protection, in particular to track the chain-of-ownership for each fragment of a given coin, as fragments of coins are used in circulation. To give a concrete example, a set of "pre-mined" coins may provided with an initial key during minting. That key may store the timestamp of when the coin was minted and can be secured by a private key, as a final step to key generation, where that key will be identified on a ledger in some concrete way (e.g., coin 1 out of 1,000,000,000). If Person A is the first buyer of this coin (and buys it whole during the Initial Coin Offering), then a new key will be generated. However, the new key may no longer be encoded with the original private key. That final step of encoding will be reversed and, in addition to the information described above, the new permissions key will now also store Person A's public key, in addition to the timestamp at the time of purchase, and the amount of the coin that Person A owns (although, in this instance, the coin is thus far undivided and therefore Person A would own the whole coin). Person A's private key will now be used to encode that information, as a final step, and that key will be stored in a ledger (along with the coin's number, e.g., 1 out of 1,000,000,000, in addition to an indicator signifying that the has not yet been divided). If Person A then sells 0.25 of the coin to Person B, in exchange for a good, then, under those conditions, two new keys are generated. Each side of the transaction will have its own new key. Just as before, the previous key will be unencrypted, and Person A's new key will store all of the same coin-history as before. However, now this new key will also indicate the timestamp for the new transaction, the value of the coin at the time of the transaction, the public key of Person B and the amount of the coin Person A now owns (0.75). Person A's private key will now be used to encode that information, as a final step. Person B's permission key will encode almost the exact same information, except that it will store the public key of Person A and the amount of the coin that Person B now owns (0.25). Moreover, Person B's private key will now be used to encode that information, as a final step. The keys for both Person A and Person B will then be recorded to that same ledger (along with the coin's number, e.g., 1 out of 1,000,000,000, and, as one embodiment, the phrase "0.75/0.25 from 1" could be included in that ledger entry to indicate the state of the coin's division). If Person B now buys something from Person C for 0.11 of this cryptocurrency, then, again, two new keys are generated. The first key will represent Person B's remaining 0.14 ownership (from Person B's 0.25 coin fragment). The second key will represent Person C's 0.11 ownership of that coin, as a second fragmentation of the 0.25 coin fragment. Again, that same chain-of-ownership history as before will be included. It will be unlocked by unencrypting it with Person B's private key. Added to that history will be the new chain-of-ownership information that is relevant to each key, and each key will be encoded with each person's private key as a final encryption step. This again culminates in the publication of those keys on that same ledger (along with the coin's number 1 out of 1,000,000,000 and also, as one embodiment, 0.11/0.14 from 0.25, to indicate the state of the coin's division). In short, the chain-of-ownership for each fragment of each coin will be preserved and verified, yielding both counterfeit protection and also another layer of transaction verification (all of which will be recorded to a ledger with General Data Immutability).

By this method, one may also create a set of "Reverse-Traverse" instructions, whereby one can trace the path of each coin-fragment to verify that all fragments add up to 1 for each coin (even without private key access to the coin's "official" chain-of-ownership history). To give a rudimentary example, from the example above, the fragments of size 0.11 and 0.14 came from a fragment of size 0.25, which came from a coin of size 1. Given this, if 0.11 is the first sub-fragment of the first fragment of the first coin, then it could have a traversal code of 1-1-1 (meaning coin number, fragment number, and the sub-fragment number for that fragment). These traversal values can also be stored along with block information (i.e., the block where a particular fragment or sub-fragment was created). Again, this may be used as an additional layer of verification for each transaction, as it can be used to verify all paths for all coin fragments for all coins being used in a transaction, to verify that each fragment in each coin can combine to sum to 1. This is distinct from the verification described in the paragraph above, given that the individual coin fragments only trace the chain-of-ownership history for the particular fragments involved.

Accordingly, this fragment-centered approach may require Wallets that will need to manage two kinds of keys: horizontal and vertical. The "horizontal" keys refers to keys that trace the chain-of-ownership for coin fragments, as discussed previously. However, it will likely be that buying a group of "5 coins" for that cryptocurrency from a Coin Exchange will actually likely yield a bundle of many keys that add up to exactly "5 coins." To keep their wallet neat and organized, the Coin-Owner may want to use a "Vertical" key that unites all of those keys into a single key. Ultimately, the Vertical Key function may be used for personal organization purposes, but would utilize the same permissions key technology as described above. In a transaction, the horizontal keys may be the keys used to verify the transaction and the actual value and ownership status of each coin fragment, given that the horizontal keys would be the keys stored on the ledger. (accompanying that data).

In an illustrative instance that a user wants to allow another party to verify the user's hash data, the user could permission that party to access original block data, in its pre-encryption state, along with a CSV file with time-stamp data for each block and a special executable program that will allow them to re-encrypt the data off-line. The verifier could also run experiments by changing data points within the provided CSV to assess changes to the hash. The user would also have the option of running an automated or manual comparisons between the reported hash for the chain and the excerpts of hashes that are recorded in the relevant set of CA SSL Certificates as described above.

Figure 10:
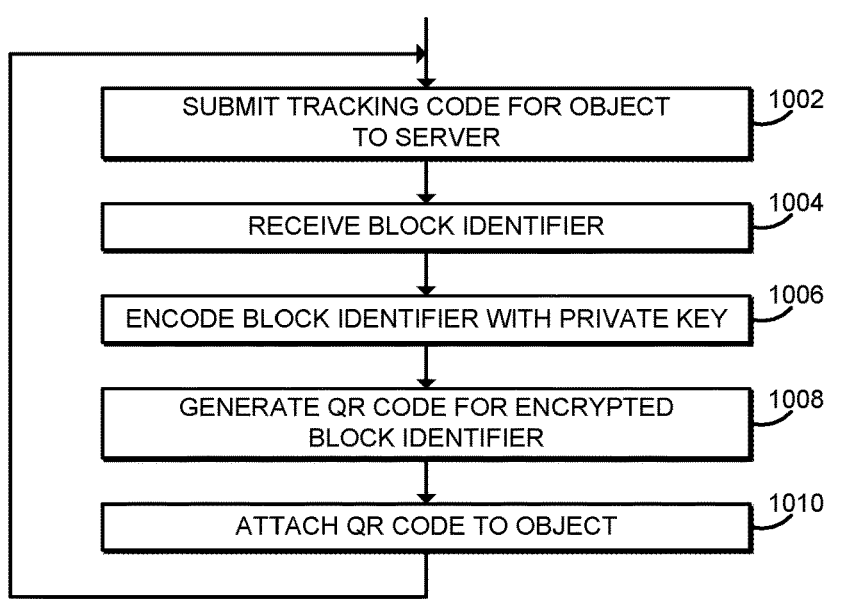
FIG. 10 is a simplified flow diagram of at least one embodiment of a method for QR code object tracking that may be executed by a client device of FIGS. 1 and 2.

Referring now to FIG. 10, in use, a client device 104 may execute a method 1000 for QR code object tracking. It should be appreciated that, in some embodiments, the operations of the method 1000 may be performed by one or more components of the environment 240 of the client device 104 as shown in FIG. 2. The method 1000 begins with block 1002, in which the client device 104 submits a tracking code for a physical object to a server 102. The physical object may be embodied as a product, prescription drug, luxury good, legal tender, government identification, supply chain object, or other physical object. The tracking code may be any serial number, name, unique identifier, or other code associated with the physical object. In response to the submission, the server 102 adds the tracking code to the blockchain.

In block 1004, the client device 104 receives a block identifier associated with the tracking code stored on the blockchain. In block 1006, the client device 104 encodes the block identifier with a private key, such as the client key 260. In block 1008, the client device 104 generates a QR code or other visual encoding of the encrypted block identifier. In block 1010, the generated QR code may be attached to the physical object for tracking. After preparing and attaching the QR code, the method 1000 loops back to block 1002, in which additional tracking codes may be added to the blockchain.

In verifying the QR code, a scanner would not need the private key that is associated with the QR code itself. That scanner may simply need to be connected via a VPN tunnel to the system 100, with permission to submit the QR code data for verification. Thus, the method 1000 may prevent counterfeiting by creating a special form of two-point authentication. Not only would a putative fraudster need the private key that is associated within the QR Code, but would also need access to that particular server 102 to verify the encoded block number.

Figure 11:
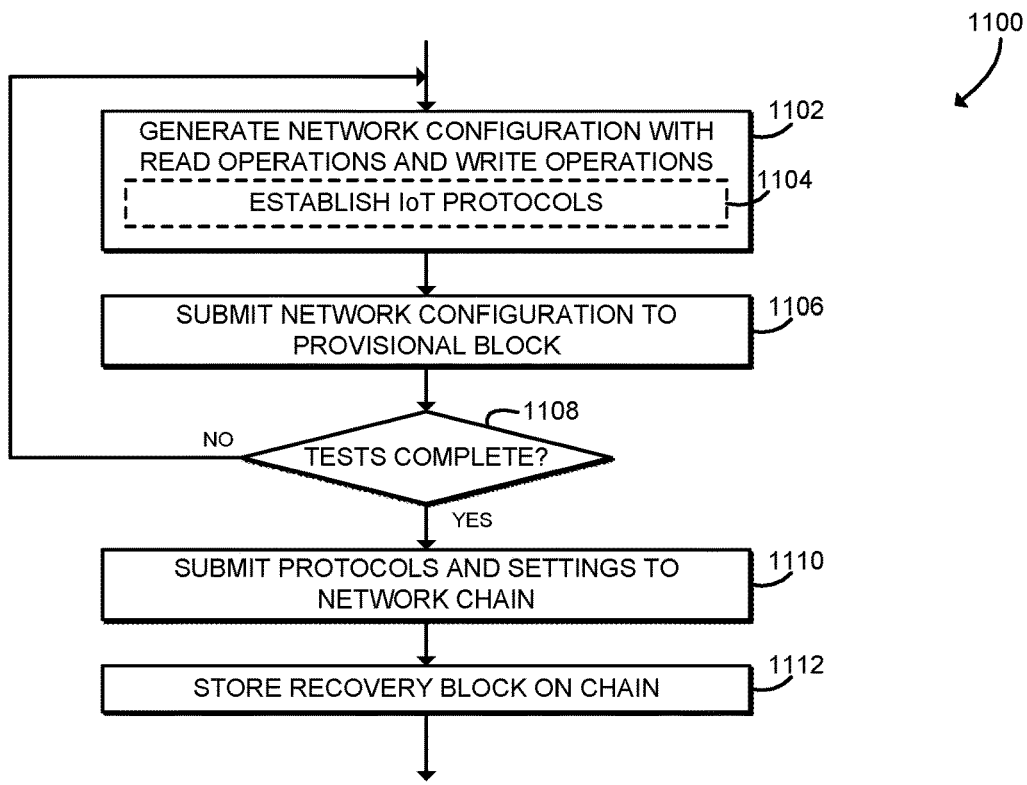
FIG. 11 is a simplified flow diagram of at least one embodiment of a method for network configuration that may be executed by a client device of FIGS. 1 and 2.

Referring now to FIG. 11, in use, a client device 104 may execute a method 1100 for network configuration. It should be appreciated that, in some embodiments, the operations of the method 1100 may be performed by one or more components of the environment 240 of the client device 104 as shown in FIG. 2. The method 1100 begins with block 1102, in which the client device 104 generates a network configuration with one or more read operations and/or write operations. When configuring a blockchain network with the system 100, the system administrator(s) conducting the configuration conduct every configuration step within a secure system 100, as a read or write operation.

In some embodiments, in block 1104 the client device 104 may establish one or more Internet of Things (IoT) protocols. IoT devices may be capable of being logged as "users" within the network, with every action to/from/within the network established by the system 100 being a secure read or write Operation on a blockchain. The administrator may develop a set of linked look-up tables that define and manage protocols for how devices on the network will interact with one another (for example, setting those protocols between either individual devices or groups of devices). The API may be open-ended, in order to accommodate any kind of device and also allowing devices from different manufacturers to work together.

For every set of devices in which protocols need to be defined, the administrator may establish which output messages will need protocols, establish protocols to make those messages machine-readable by the system 100 (e.g., by the servers 102 of the system 100), assign protocols to the servers 102, so that a server 102 may serve as an intermediary between devices, and establish protocols for the servers 102 to send commands or data to other devices within the network. In taking this approach, although the network is a "star configuration," it may recover the functionality of a "mesh network," including "self-healing" measures for the network, such as re-routing, TCP/IP, and any redundancies that might be necessary to ensure system resilience. Protocols can also be created for special alerts/updates to the client to flag network conditions and/or readings for human review.

In block 1106, the client device 104 submits the network configuration to a provisional block on the blockchain. During the network configuration phase, the administrator works within the context of a provisional block, which serves as a "scratch-sheet." During this phase, the Administrator will be able to test protocols for IoT devices and conduct any other tests that may be necessary to verify that their configuration is ready to be implemented. In block 1108, the client device 104 determines whether all tests of the network configuration are satisfactorily completed. If not, the method 1100 loops back to block 1102 to continue generating the network configuration. If tests are completed, the method 1100 advances to block 1110.

In block 1110, the client device 104 submits the protocols and settings to the network chain stored by the server 102. Loading the protocols and settings to the network chain allows the configured settings to be put into production. In block 1112, the client device 104 stores a recovery block on the chain. The recovery block may allow the administrator to re-open the exact version of the Network Configuration API with the exact same settings, if any subsequent changes to the network configuration become necessary. After storing the recovery block, the method 110 is completed.

By this, even the network configuration process may be preserved to the chain. As one example, if IoT devices work in concert with one another on a blockchain network established by the system 100, then the full history and manner of their configuration can also be recorded. This network configuration process can also create an extra layer of resilience and security. For example, if an administrator's login credentials are ever compromised (for example, by human error), any changes made by the attacker would be fully tracked and logged. Moreover, any such changes to the network configuration would also be easily reversible.

The system 100 may also be used with additional applications. NFTs (or Non-Fungible Tokens) are becoming an increasingly valuable way of creating "original" digital intellectual property, in which title for that property can be transferred electronically through a blockchain system. Because the system 100 can store any file type of any file size in the blockchain data 218, this creates a revolution for NFTs, given that the actual digital property can be stored within the system 100, rather than merely the hash. Moreover, a user could also request an SSL Certificate from a trusted CA for the final block. This may allow for a true digital original to be generated and stored.

In addition to being a banking platform, the system 100 may also be a brokerage platform for NFTs. For example, if an NFT is minted by a content-creator using the system 100 platform, the minting process can include the creation of a smart contract system. If, for example, a song is being stored as an NFT, then a digital streaming platform may be required to use that smart contract in streaming that particular song. Given that this will allow the NFT to build a secure, immutable record of transactions connected to it, the attached transaction record may help build and store the NFT's market value.

This NFT Bank may also allow for a base of value from which a cryptocurrency can be created/minted. Similar to the gold standard, the currency would be tied to the market value of the NFTs being banked within the system 100.

As another example, certain customers may store data on a blockchain provided by the system 100 specifically to improve their data analytics capabilities. As described above, the system 100 can store any file type of any file size on a blockchain. That versatility is useful for data analytics. For example, an organization can use the system 100 to gather and organize large numbers of records (e.g., medical records, financial records, supply chain documentation, etc.). Once loaded onto the chain, these documents can then be subjected to automated review by a machine learning algorithm, built into the system 100 as an internal protocol.

As an additional example, the system 100 may be used in elections technology to improve election security (e.g., by preventing voter fraud). For example, the use of QR code authentication for government identification as described above in connection with FIG. 10 may have cross-application in the election security application. Additionally, the inside-lock sandbox feature described above may protect privacy of voters while verifying their identity to prevent repeat voting.

As yet another example, by integrating multiple features together (including the inside-lock sandbox, signatures, permissions, permissions keys, and QR code verification systems described above), the system 100 may be used for identity banking. As described above, the system 100 may be used to securely disseminate information across networks in an orderly way, creating a secure and immutable record of the request and approval process. Also, as described above, the QR code verification system may be used to prevent the counterfeiting of government-issued identification. Accordingly, governments may shift records (such as Drivers Licenses, Birth Certificates, and Passports) to storage with the system 100. Given the inside-lock sandbox, all customer data is secure. Accordingly, consumers may create their own accounts with the system 100, where the consumer can then store all of the consumer's personal records (including medical documents, government documents, and work documents), enjoying the benefits of date privacy/security while also enjoying the convenience of being able to use the signatures, permissions, and permissions key functions to safely disseminate that information, as needed, in a safe, efficient and orderly way.

Continuing that example, identity banking may be convenient for those who might have lost physical copies of government identification (e.g., a passport lost while overseas). Identity banking may be helpful to Human Resources departments, when requesting information from new hires. Identity banking may be helpful in the financial sector to instantly verify information for transactions. Identity banking may also be be helpful to persons who are changing medical providers and wish to safely and efficiently transmit all past medical records to new providers.

As a further example, identity banking may shift to identity brokerage, which encompasses the broadest spectrum of consumer data in a way that places control of that data (and its marketability) back into the hands of the consumer. For identity brokerage, the system 100 may be used as the basis for applications such as smart phones, smart home technology, operating systems, internet browsers, search engines, e-commerce sites, social media, private messaging, and dating applications. Through these applications, consumer data is kept private (via the inside-lock sandbox) and yet it is still stored, in accordance with customer wishes, with the system 100 via a blockchain that stays within the absolute control of the customer.

In that example, customers have sole discretion as to how their data is gathered, if at all. Generally, the data will be written to cycled chains (with all time-bounds and permissions completely controlled by the customer), and the customer would normally store a separate chain for each kind of data being tracked. Although a customer would not have the option of removing/editing a block from their chain, once added, the customer would, however, have the ability to restrict viewing of certain blocks by adjusting permission levels for those blocks. The customer would also have ways of preventing certain kinds of data from being added to their chain at all, on a more general basis (e.g., to record browser history but not search engine history). The customer could also make the choice to temporarily suspend any or all recording of their activities at any time, whenever desired.

Once this data is gathered, the customer then has the option of selling the customer's data to marketing companies in a controlled way, if a customer chooses to do so, but will also have the option of keeping all of that data completely private. If the customer chooses to sell any of the customer's data, the customer has sole discretion as to which portions to sell and which to keep private. Of course, certain streams of data may not generally carry any identifying information within it (e.g., search engine history or browser history). In those instances, a customer may desire to sell entire data-chains (but do so anonymously). To facilitate those transactions, the system 100 may verify that a data-seller is a valid identity bank account holder with a unique and verified government-issued ID on file. The system 100 is capable of confirming these verifications to a data-buyer without divulging any of the data-seller's identifying information. The data-buyer may negotiate with the data-seller to include other information as well (e.g., demographic information such as race or gender), and the system 100 can also confirm that information as well, if requested by the data-seller.

In contexts such as social media and private messaging, special protocols may be enacted to prevent any user from selling any information that includes the data of others. On those platforms, a user's data preferences may be made public to the other user (e.g., whether the user is willing to sell data or not, and, if so, whether the user would prefer to maintain anonymity). The users may be able to set their terms/preferences, from person to person or group to group, however they might prefer. If both parties in an exchange are willing to sell their data, then a smart-contract may be automatically generated for that exchange, in accordance with the parties' stated preferences regarding personal anonymity. That smart contract can be terminated at any time during that exchange (and will be automatically terminated or revised, if either party decides to change their terms for how the data is to be packaged). At the end of the exchange, if packaged for sale, both parties receive an official blockchain transcript for that conversation from the system 100. If either party sells that conversation to a data-buyer, then all parties to the conversation will be compensated in accordance with clear and standardized smart contract terms.

Even a customer who has no interest in ever selling that customer's data may have an interest in privacy. Thus, by using the system 100, that user may place all of his or her personal technology within an inside-lock sandbox, which keeps that user's data completely private. If the user so chooses, the user may opt to run that feature while opting out of creating any sort of record of the user's activities on the blockchain.

The invention claimed is:

1. A computing device for trust protocol execution, the computing device comprising:
   a client interface to receive an input data block from a client computing device;
   a block encoder to: (i) encode the input data block with an encoding pad to generate an encoded data block, wherein the encoding pad comprises an array of byte values having a length equal to a maximum byte value, and wherein each value of the array of values is unique, (ii) generate a hash value as a function of the encoded data block with a cryptographic hash function, and (iii) modify the encoding pad as a function of the hash value to generate a modified encoding pad, wherein to modify the encoding pad comprises to convert the hash value to a sequence of pairs of bytes and, for each pair of bytes, (i) index the encoding pad at a first byte index of the pair of bytes and at a second byte index of the pair of bytes and (ii) swap encoding pad values at the first byte index and at the second byte index; and
   a chain manager to add the encoded data block to a blockchain.

2. The computing device of claim 1, wherein:
   the client interface is further to receive a second input data block from the client computing device; and
   the block encoder is further to: (i) encode the second input data block with the modified encoding pad to generate a second encoded data block, (ii) generate a second hash value as a function of the second encoded data block with the cryptographic hash function, and (iii) modify the modified encoding pad as a function of the second hash value to generate a second modified encoding pad.

3. The computing device of claim 1, wherein to encode the input data block with the encoding pad comprises, for each input byte of the input data block to index the encoding pad with the input byte to retrieve an output byte.

4. The computing device of claim 1, wherein to add the encoded data block to the blockchain comprises to:
   determine a timestamp, wherein the timestamp comprises a current time at microsecond resolution;

add the timestamp as a header to the encoded data block;
generate a verification puzzle based on the timestamp and the encoding pad; and
add the verification puzzle to the encoded data block.

5. The computing device of claim 4, wherein to generate the verification puzzle comprises to:
select a predetermined number of bytes from the timestamp; and
record the predetermined number of bytes and, for each predetermined byte, a corresponding position in the encoding pad.

6. The computing device of claim 1, wherein to add the encoded data block to the blockchain comprises to:
generate a web page based on the encoded data block;
generate a web address for the web page as a function of the hash value; and
request a security certificate for the web address from a third-party certificate authority.

7. The computing device of claim 6, wherein:
to generate the web address comprises to select a predetermined number of characters from the hash value;
to add the encoded data block to the blockchain further comprises to determine whether a predetermined number of encoded data blocks have been added to the blockchain; and
to request the security certificate for the web address comprises to request the security certificate in response to a determination that the predetermined number of encoded data blocks have been added to the blockchain.

8. The computing device of claim 1, wherein:
the client interface is further to verify a permissions key in response to receipt of the input data block, wherein the input data block comprises the permissions key; and
to add the encoded data block comprises to add the encoded data block in response to verification of the permission key.

9. The computing device of claim 1, wherein:
the chain manager is further to execute a command in response to receipt of the input data block, wherein the input data block comprises the command; and
to add the encoded data block comprises to add the encoded data block in response to execution of the command.

10. A method for trust protocol execution, the method comprising:
receiving, by a computing device, an input data block from a client computing device;
encoding, by the computing device, the input data block with an encoding pad to generate an encoded data block, wherein the encoding pad comprises an array of byte values having a length equal to a maximum byte value, and wherein each value of the array of values is unique;
generating, by the computing device, a hash value as a function of the encoded data block using a cryptographic hash function;
modifying, by the computing device, the encoding pad as a function of the hash value to generate a modified encoding pad, wherein to modify the encoding pad comprises to convert the hash value to a sequence of pairs of bytes and, for each pair of bytes, (i) index the encoding pad at a first byte index of the pair of bytes and at a second byte index of the pair of bytes and (ii) swap encoding pad values at the first byte index and at the second byte index; and
adding, by the computing device, the encoded data block to a blockchain.

11. The method of claim 10, wherein adding the encoded data block to the blockchain comprises:
determining a timestamp, wherein the timestamp comprises a current time at microsecond resolution;
adding the timestamp as a header to the encoded data block;
generating a verification puzzle based on the timestamp and the encoding pad; and
adding the verification puzzle to the encoded data block.

12. The method of claim 10, wherein adding the encoded data block to the blockchain comprises:
generating a web page based on the encoded data block;
generating a web address for the web page as a function of the hash value; and
requesting a security certificate for the web address from a third-party certificate authority.

* * * * *